US012798198B2

(12) United States Patent
Uchida et al.

(10) Patent No.: US 12,798,198 B2
(45) Date of Patent: Nov. 17, 2026

(54) METAL MEMBER, METAL-RESIN COMPOSITE, METHOD FOR PRODUCING THE METAL MEMBER, AND METHOD FOR PRODUCING THE METAL-RESIN COMPOSITE

(71) Applicants: Prime Planet Energy & Solutions, Inc., Tokyo (JP); TOYOTA JIDOSHA KABUSHIKI KAISHA, Aichi-ken (JP); PRIMEARTH EV ENERGY CO., LTD., Shizuoka-ken (JP)

(72) Inventors: Yozo Uchida, Toyota (JP); Yuki Sato, Toyota (JP); Tsuyoshi Ehara, Toyota (JP); Syoichi Tsuchiya, Toyota (JP); Masataka Asai, Toyota (JP); Tsuyoshi Asano, Toyota (JP); Masahiro Uchimura, Miyoshi (JP); Yasuaki Nagano, Kosai (JP); Shigeru Matsumoto, Toyohashi (JP)

(73) Assignees: PRIME PLANET ENERGY & SOLUTIONS, INC., Tokyo (JP); TOYOTA JIDOSHA KABUSHIKI KAISHA, Aich-Ken (JP); TOYOTA BATTERY CO., LTD., Shizuoka-ken (JP)

( * ) Notice: Subject to any disclaimer, the term of this patent is extended or adjusted under 35 U.S.C. 154(b) by 73 days.

(21) Appl. No.: 18/641,438

(22) Filed: Apr. 22, 2024

(65) Prior Publication Data

US 2025/0010555 A1 Jan. 9, 2025

(30) Foreign Application Priority Data

Jul. 7, 2023 (JP) ................................ 2023-111839

(51) Int. Cl.
*B29C 65/00* (2006.01)

(52) U.S. Cl.
CPC .......... *B29C 66/742* (2013.01); *B29C 66/028* (2013.01); *B29C 66/73161* (2013.01)

(58) Field of Classification Search
CPC ................ B29C 66/742; B29C 66/028; B29C 66/73161; B29C 70/68
See application file for complete search history.

(56) References Cited

U.S. PATENT DOCUMENTS

| | | | |
|---|---|---|---|
| 2006/0117701 A1 | 6/2006 | Kajimura | |
| 2011/0027645 A1 | 2/2011 | Komatsuki et al. | |

(Continued)

FOREIGN PATENT DOCUMENTS

| | | | |
|---|---|---|---|
| CN | 103872280 B | 2/2018 | |
| CN | 110400895 A | 11/2019 | |

(Continued)

*Primary Examiner* — Donald M Flores, Jr.
(74) *Attorney, Agent, or Firm* — HAUPTMAN HAM, LLP

(57) ABSTRACT

A metal member (a lid member and a positive terminal member) has a surface with a joining region to be joined to a resin member (a positive-electrode resin member) to seal between the first space and the second space (outside and inside of a battery) in combination with the resin member. The joining region includes a roughened region formed on the surface and constituted of a base layer composed of accumulated debris particles, and a column group layer composed of nano columnar bodies standing densely in two dimensions, each being formed of the debris particles bonding to one another like strings of beads extending in the height direction from the base layer. The nano columnar bodies in the resin member have an average height of 84 nm or more.

4 Claims, 16 Drawing Sheets

(56) References Cited

U.S. PATENT DOCUMENTS

| | | | | |
|---|---|---|---|---|
| 2014/0170444 | A1 | 6/2014 | Watanabe et al. | |
| 2014/0220395 | A1 | 8/2014 | Ootsuka | |
| 2015/0224742 | A1 | 8/2015 | Inoue et al. | |
| 2016/0207148 | A1* | 7/2016 | Kobayashi | B23K 26/354 |
| 2017/0179451 | A1 | 6/2017 | Ootsuka | |
| 2018/0062132 | A1 | 3/2018 | Ono et al. | |
| 2019/0176268 | A1* | 6/2019 | Itakura | B23K 26/00 |
| 2021/0036285 | A1 | 2/2021 | Huang et al. | |
| 2022/0158279 | A1 | 5/2022 | Kadoi | |
| 2023/0387542 | A1 | 11/2023 | Uchida et al. | |
| 2024/0234995 | A1 | 7/2024 | Liu | |
| 2025/0210811 | A1* | 6/2025 | Uchida | H01M 50/159 |
| 2025/0233260 | A1* | 7/2025 | Uchida | H01M 50/184 |

FOREIGN PATENT DOCUMENTS

| | | | |
|---|---|---|---|
| EP | 4184673 | A1 | 5/2023 |
| JP | 2003-132866 | A | 5/2003 |
| JP | 2005-282165 | A | 10/2005 |
| JP | 2006-147422 | A | 6/2006 |
| JP | 2013-055038 | A | 3/2013 |
| JP | 2014-117724 | A | 6/2014 |
| JP | 2014-164850 | A | 9/2014 |
| JP | 5714193 | B1 | 5/2015 |
| JP | 2015-185225 | A | 10/2015 |
| JP | 2017-117750 | A | 6/2017 |
| JP | 2017-195165 | A | 10/2017 |
| JP | 2018-032605 | A | 3/2018 |
| JP | 2018-075805 | A | 5/2018 |
| JP | 2018-164989 | A | 10/2018 |
| JP | 2019119093 | A | 7/2019 |
| JP | 2022-028587 | A | 2/2022 |
| JP | 2022079172 | A | 5/2022 |
| WO | 2023/066024 | A1 | 4/2023 |

* cited by examiner

FIG. 14

Table showing the relationship between various conditions of pulse laser and the average height and the surface area ratio of nano columnar bodies in roughened areas

| MATERIAL TYPE OF METAL MEMBER | PULSE LASER IRRADIATION CONDITIONS | | AVERAGE HEIGHT OF NANO COLUMNAR BODIES (nm) | SURFACE AREA RATIO |
|---|---|---|---|---|
| | OUTPUT (W) | SPOT DIAMETER (μm) | | |
| ALUMINUM (A1050) | 20 to 90 | 55 to 85 | 156 | 38.8 |
| | | | 97 | 25.0 |
| | | | 84 | 21.0 |
| | | | 55 | 9.9 |
| | | | 103 | 26.3 |
| | | | 102 | 19.5 |
| | | | 271 | 71.5 |
| COPPER (C1100) | 3 to 30 | 55 to 100 | 167 | 20.7 |
| | | | 106 | 16.5 |
| | | | 92 | 16.6 |
| | | | 88 | 12.9 |
| | | | 79 | 9.8 |
| | | | 138 | 13.7 |
| | | | 118 | 15.3 |

METAL MEMBER, METAL-RESIN COMPOSITE, METHOD FOR PRODUCING THE METAL MEMBER, AND METHOD FOR PRODUCING THE METAL-RESIN COMPOSITE

CROSS-REFERENCE TO RELATED APPLICATIONS

This application is based upon and claims the benefit of priority to Japanese Patent Application No. 2023-111839 filed on Jul. 7, 2023, the entire contents of which are incorporated herein by reference.

BACKGROUND

Technical Field

The disclosure relates to a metal member, a metal-resin composite, a method for producing the metal member, and a method of producing the metal-resin composite.

Related Art

A metal-resin composite composed of a metal member and a resin member joined together has been known. To enhance the sealing properties between the metal member and the resin member, the surface of the metal member would be subjected to a roughening process using for example a laser in advance. One example of a related art thereto is Japanese unexamined patent application publication No. 2018-075805 (JP 2018-075805A).

JP 2018-075805A discloses that the surface of the metal member is formed with nano recesses with an opening width L and a depth D on submicron-order or nano-order. Specifically, the nano recesses are formed to establish the relationship between the opening width L and the depth D as D/L≥1. In other words, the surface of the metal member is formed with protrusions with such a length or shape that cannot be regarded as columnar portions as a whole.

SUMMARY

Technical Problems

However, the conventional metal member is insufficient in sealing properties at the joining portion joined to the resin member and thus is desired to achieve the enhanced sealing properties.

The present disclosure has been made to address the above problems and has a purpose to provide a metal member with excellent sealing properties at a joining portion joined to a resin member and a method for producing the metal member, and a metal-resin composite with excellent sealing properties and a method for producing the metal-resin composite.

Means of Solving the Problems

To achieve the above-mentioned purpose, one aspect of the present disclosure provides a metal member having a surface with a joining region to be joined to a resin member to seal between a first space and a second space in combination with the resin member, wherein the joining region includes a roughened region formed on the surface, the roughened region comprising: a base layer composed of accumulated debris particles; and a column group layer composed of nano columnar bodies standing densely in two dimensions, the nano columnar bodies being formed of the debris particles bonding to one another in a form of strings of beads extending from the base layer in a height direction, and the nano columnar bodies in the roughened region have an average height of 84 nm or more.

According to the metal member configured as above, the surface of the metal member is formed with the joining region, which is joined to the resin member when the metal member is connected to another metal member via the resin member, to seal the space or gaps between the metal member and the other metal member, and this joining region to be joined to the resin member includes the roughened region formed with the base layer in which debris particles are accumulated and the column group layer in which the nano columnar bodies stand densely in two dimensions, the nano columnar bodies being formed of the debris particles that bond or adhere to one another like strings of beads extending from the base layer in the height direction. The average height of the nano columnar bodies in the roughened region is 84 nm or more. This configuration can enhance the sealing properties of the joining portion when joined to the resin member.

Another aspect of the disclosure provides a metal-resin composite including: the above-described metal member; and the resin member joined to the metal member, wherein the resin member is made of resin filled in gaps between the nano columnar bodies until reaching the base layer.

Another aspect of the disclosure provides a method for producing the above-described metal member, comprising: irradiating the surface of the metal member, on which the column group layer is not formed and the roughened region is to be formed, with a pulse laser, so that debris particles generated from the metal member irradiated with the pulse laser are accumulated onto the surface of the metal member and grow into the nano columnar bodies to form the roughened region.

Furthermore, another aspect of the disclosure provides a method for producing the above-described metal-resin composite, comprising: filling molten resin melted by heat into gaps between the nano columnar bodies that constitute the column group layer until reaching the base layer; and solidifying the molten resin filled in the gaps between the nano columnar bodies constituting the column group layer to form the resin member joined to the roughened region of the metal member.

BRIEF DESCRIPTION OF THE DRAWINGS

FIG. 4 is a perspective view of a unit member extracted from the battery in

FIG. 1;

FIG. 14 is a table showing a relationship between various conditions for pulse laser irradiation applied on a roughened region and average heights and surface area ratios of nano columnar bodies formed in the roughened region;

DETAILED DESCRIPTION OF THE EXEMPLARY EMBODIMENTS

A detailed description of an embodiment of this disclosure will now be given referring to the accompanying drawings. A battery 1 constituting a metal-resin composite, which is a combined body of metal and resin components, is a rectangular, sealed lithium-ion secondary battery to be mounted in vehicles, such as hybrid cars, plug-in hybrid cars, and electric cars. In the following description, the reference signs X, Y, and Z in figures represent specific directions, that is, a right-left direction, a front-back direction, and an upper-lower direction, respectively. For each direction indicated by a double-headed arrow, the reference signs U, D, L, R, F, and B represent specific positions, i.e., an upper side, a lower side, a left side, a right side, a front side, and a back side, respectively. However, those directions and positions are merely identified for convenience of explanation and do not limit the orientation of the battery 1 to be installed.

Configuration of Battery

Figure 1:
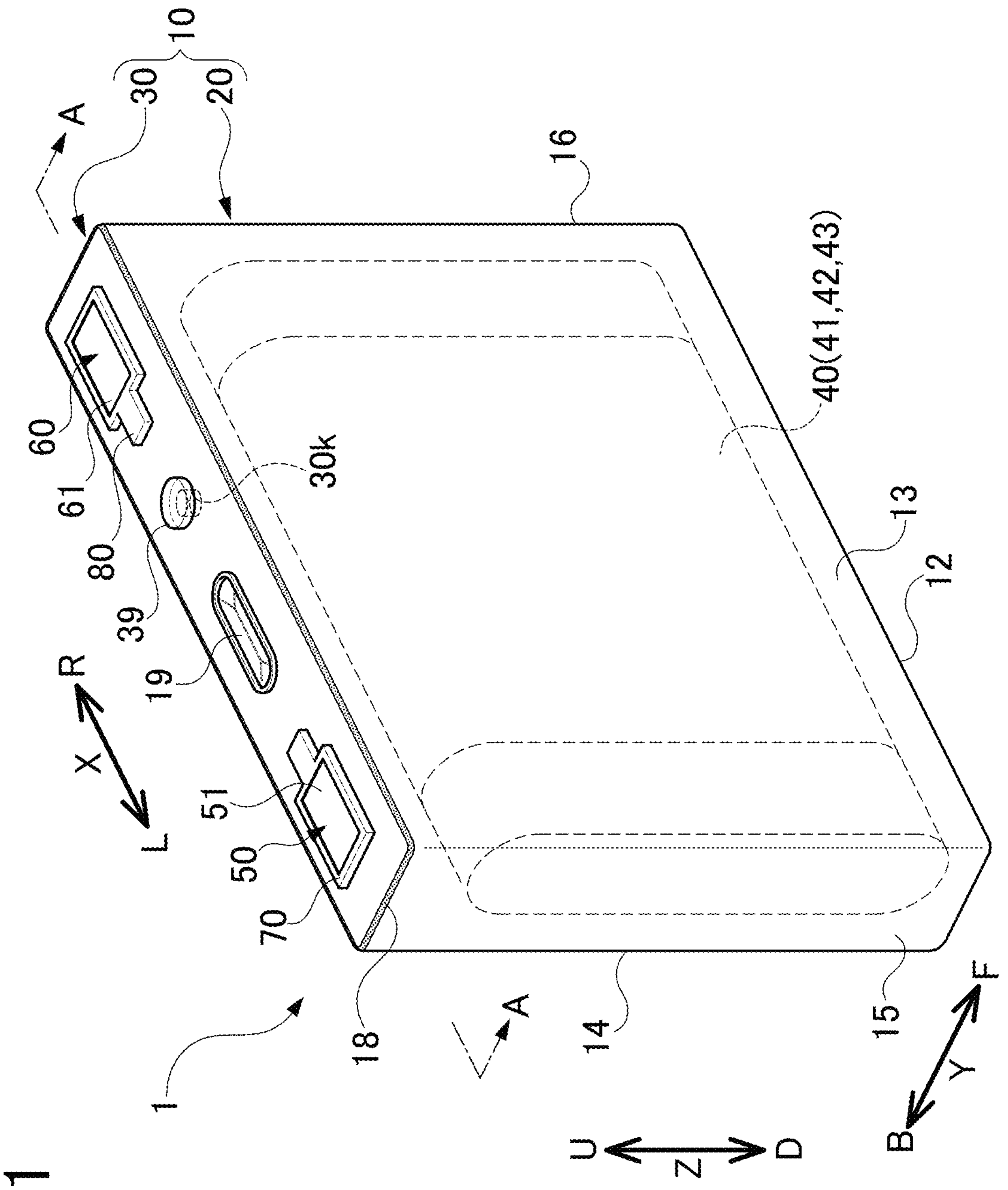
FIG. 1 is a perspective view of a battery in an embodiment.
Figure 2:
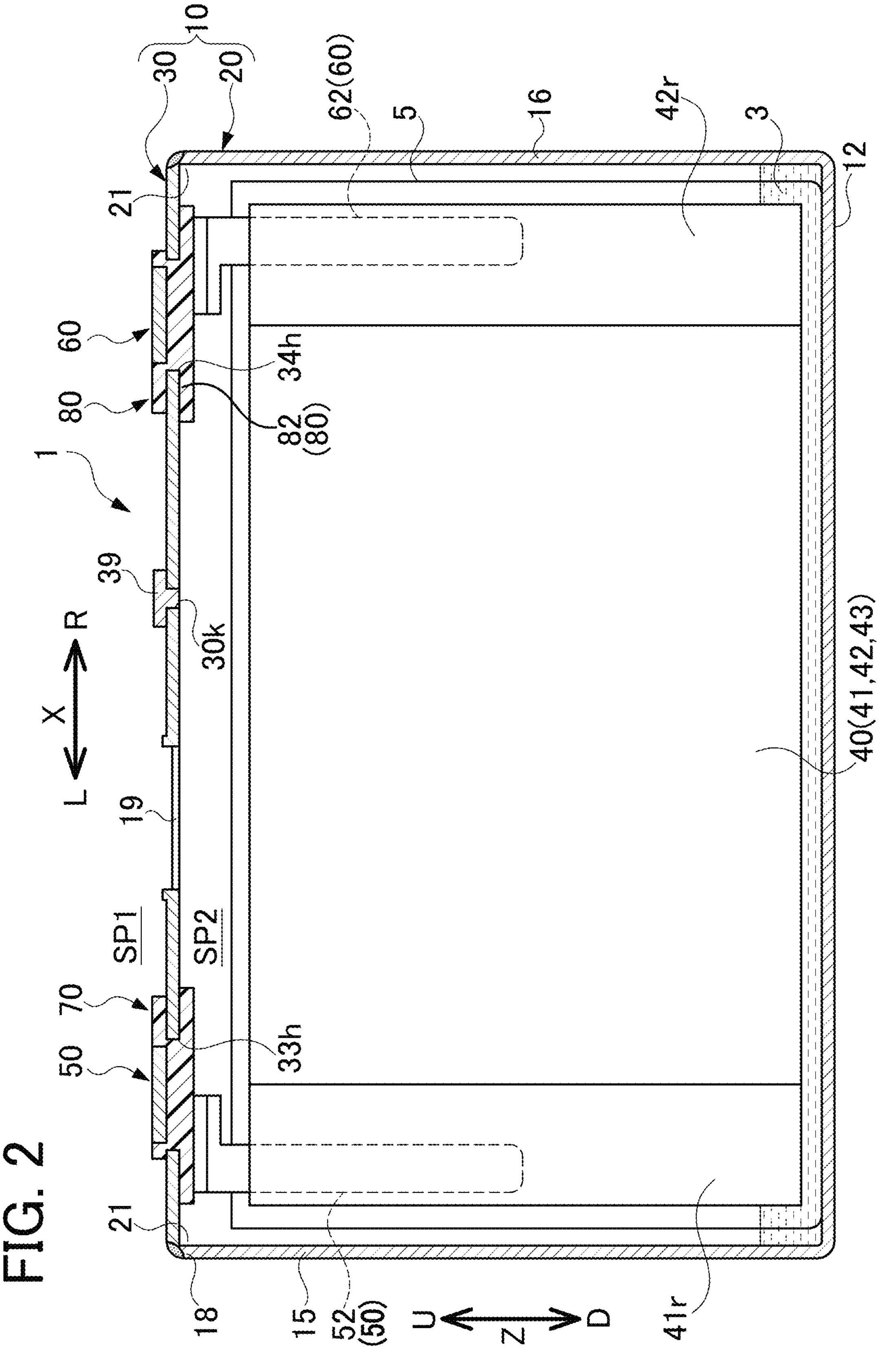
FIG. 2 is a cross-sectional view of the battery cut along a line A-A in FIG. 1.

FIG. 1 is a perspective view of the battery 1. FIG. 2 is a cross-sectional view of the battery 1 cut along a line A-A in FIG. 1. As shown in FIGS. 1 and 2, the battery 1 includes a case 10 with a sealed interior, an electrode body 40, an electrolyte 3, and an insulating holder 5, which are housed in the case 10, and further a positive terminal member 50 and a negative terminal member 60 each connected to the electrode body 40.

The case 10 has an overall flat and bottomed rectangular parallelepiped shape. In this embodiment, the case 10 is made of aluminum. However, the material of the case 10 is not limited to aluminum, but is preferably metal. For example, the material of the case 10 may be any metal, such as aluminum alloy, iron, iron alloy, and others. This case 10 is composed of a case body 20 and a lid member 30. The lid member 30, the positive terminal member 50, and the negative terminal member 60 are one example of a metal member of the disclosure.

The case body 20 has a bottomed rectangular tube-like, or box-like, shape with an opening 21. In other words, the case body 20 includes a rectangular plate-shaped bottom 12, a pair of front side part 13 and back side part 14, extending vertically from the long edges of the bottom 12 on the front side F and the back side B respectively, and a pair of left side part 15 and right side part 16, extending vertically from the short edges of the bottom 12 on the left side L and the right side R. The opening 21 has a rectangular shape with a long side direction corresponding to the right-left direction X and a short side direction corresponding to the front-back direction Y. The bottom 12 has a rectangular plate shape with a long side direction corresponding to the right-left direction X and a short side direction corresponding to extending in the front-back direction Y. Each of the front side part 13 and the back side part 14 has a rectangular plate shape with a long side direction corresponding to the right-left direction X and a short side direction corresponding to the upper-lower direction Z. Each of the left side part 15 and the right side part 16 has a rectangular plate shape with a long side direction corresponding to the upper-lower direction Z and a short side corresponding to the front-back direction Y.

The height of each of the front side part 13 and the back side part 14, i.e., the length thereof in the upper-lower direction Z, is equal to the height of each of the left side part 15 and the right side part 16. The height of the front side part 13 and the back side part 14 (i.e., the length thereof in the upper-lower direction Z) and the length of the front side part 13 and the back side part 14 in the right-left direction X are very longer than the length of the left side part 15 and the right side part 16 in the front-back direction Y. Therefore, in the following description, the right-left direction X, the front-back direction Y, and the upper-lower direction Z of the case 10, case body 20, and lid member 30 are also referred to as a longitudinal direction, a width direction, and a height direction, respectively.

The lid member 30 closes the opening 21 of the case body 20. In detail, a peripheral edge portion of the lid member 30 is laser-welded over its entire circumference to the ends of the front side part 13, back side part 14, left side part 15, and right side part 16 on the upper side U. At the boundary between the upper end of the case body 20 and the peripheral edge portion of the lid member 30, the case body and the lid member 30 are melted by laser and then solidified, forming a melt-solidified portion 18 over the entire circumference.

The lid member 30 is provided with a safety valve 19 at a position slightly to the left side L relative to the center in the right-left direction X. This safety valve 19 will break open when the internal pressure of the case 10 exceeds a valve opening pressure. The lid member 30 is further formed with a liquid inlet 30*k*, penetrating through the lid member 30 in the upper-lower direction Z, at a position slightly to the right side R relative to the center in the right-left direction X. A sealing member 39 made of aluminum is fitted in the liquid inlet 30*k* from above to hermetically seal the liquid inlet 30*k*.

The lid member 30 is formed with an insertion hole 33*h* for a positive electrode, which will be referred to as a positive-electrode insertion hole 33*h*, penetrating through the lid member 30 in the upper-lower direction Z, near an end on one side (i.e., on the left side L in FIGS. 1 and 2) in the right-left direction X. Further, the lid member 30 is formed with an insertion hole 34*h* for a negative electrode, which will be referred to as a negative-electrode insertion hole 34*h*, penetrating through the lid member 30 in the upper-lower direction Z, near an end on the other side (i.e., the right side R in FIGS. 1 and 2) in the right-left direction X. The positive-electrode insertion hole 33*h* and the negative-electrode insertion hole 34*h* are each formed in a rectangular shape with a long side direction corresponding to the right-left direction X and a short side direction corresponding to the front-back direction Y. In the positive-electrode insertion hole 33*h*, the positive terminal member 50 having an overall vertically-long shape (extended in one direction) is inserted from the upper side U along its longwise direction. In the negative-electrode insertion hole 34*h*, the negative terminal member 60 having an overall vertically-long shape (extended in one direction) is inserted from the upper side U along its longwise direction.

The positive terminal member 50 is fixed to the lid member 30 while being insulated from the lid member 30 via a resin member 70 for a positive electrode, which will be referred to as a positive-electrode resin member 70. Thus, the positive terminal member 50 is supported by the lid member 30 via the positive-electrode resin member 70. In this embodiment, the positive terminal member 50 is made of aluminum. However, the material of the positive terminal member 50 may be appropriately selected from any materials that can be electrically connected to a positive current collecting part 41*r* of the electrode body 40, which will be mentioned later.

The negative terminal member 60 is fixed to the lid member 30 while being insulated from the lid member 30 via a resin member 80 for a negative electrode, which will be referred to as a negative-electrode resin member 80. Thus, the negative terminal member 60 is supported by the lid member 30 via the negative-electrode resin member 80. In this embodiment, the negative terminal member 60 is made of copper. However, the material of the negative terminal member 60 may be appropriately selected from any materials that can be electrically connected to a negative current collecting part 42*r* of the electrode body 40, which will be mentioned later.

The electrode body 40 is a so-called wound electrode body. In this electrode body 40, a strip-shaped positive electrode sheet 41 and a strip-shaped negative electrode sheet 42 are wound together in a predetermined winding direction while alternately interposing strip-shaped separators 43 therebetween. The resultant electrode body 40 has an overall flat shape including side surfaces on the front side F and the back side B, each having a horizontal rectangular shape extending in the upper-lower direction Z and the right-left direction X.

The positive electrode sheet 41 includes a positive current collecting foil (not shown) and a positive active material layer (not shown) formed on this foil. The positive current collecting foil in the embodiment is made of aluminum. However, the material of the positive current collecting foil may be appropriately selected from any materials that can serve the function of the positive electrode of a lithium-ion secondary battery. On the other hand, the negative electrode sheet 42 includes a negative current collecting foil (not shown) and a negative active material layer (not shown) formed on this foil. The negative collecting foil in the embodiment is made of copper. However, the material of the negative current collecting foil may be appropriately selected from any materials that can serve the function of the negative electrode of a lithium-ion secondary battery.

The electrode body 40 includes the positive current collecting part 41*r*, which is an exposed part of the positive current collecting foil. To this positive current collecting part 41*r*, a positive terminal lower part 52 of the positive terminal member 50 is joined. Similarly, the electrode body 40 further includes the negative current collecting part 42*r*, which is an exposed part of the negative current collecting foil. To this negative current collecting part 42*r*, a negative terminal lower part 62 of the negative terminal member 60 is joined. Accordingly, the electrode body 40 is supported by the lid member 30 via the positive terminal member 50 and the negative terminal member 60.

Although detailed illustrations are omitted in the figures, the positive current collecting part 41*r* is a wound part of only the positive current collecting foil protruding in the axial direction of the electrode body 40 from the negative electrode sheet 42 and separators 43. Similarly, the negative current collecting part 42*r* is a wound part of only the negative current collecting foil protruding in the axial direction of the electrode body 40 from the positive electrode sheet 41 and separators 43. In this embodiment, the positive current collecting part 41*r* is located at one end of the electrode body 40 on the left side L, while the negative current collecting part 42*r* is located at the other end of the electrode body 40 on the right side R.

Further, the electrode body 40 is placed apart at constant distances from the bottom 12, front side part 13, back side part 14, left side part 15, and right side part 16 of the case body 20, and the lid member 30. Between the electrode body 40 and the case body 20, the insulating holder 5 is located to reliably maintain the insulation therebetween. The shape and the material of the insulating holder 5 may be appropriately selected from any shapes and materials that allow the insulating holder to be placed between the electrode body 40 and the case body 20 and to insulate between them. In this embodiment, the insulating holder 5 is produced from a strip-shaped film made of polypropylene (PP), which is a synthetic resin, and formed in a pouch shape with an opening on the upper side U, in which the electrode body 40 is enclosed. Specifically, the insulating holder 5 insulates the outer surfaces of the electrode body 40 facing the case body 20 from the inner surfaces of the bottom 12, front side part 13, back side part 14, left side part 15, and right side part 16 of the case body 20.

The positive-electrode resin member 70 is made of thermoplastic resin, specifically, polyphenylene sulfide (PPS) in the embodiment. The positive-electrode resin member 70 is joined to each of the lid member 30 and the positive terminal member 50. Since the positive-electrode resin member 70 is joined to the lid member and the positive terminal member 50, these lid member 30, positive terminal member 50, and positive-electrode resin member 70 are integrated as a unit. Thus, the battery 1 including this integrated unit constitutes a metal and resin composite. The positive-electrode resin member 70 hermetically seals while insulating between the lid member 30 and the positive terminal member 50. Specifically, the positive-electrode resin member 70 functions as both a member for insulating and a member for sealing between the lid member 30 and the positive terminal member 50. The material of the positive-electrode resin member 70 may be appropriately selected from any materials that can hermetically seal and insulate between the lid member 30 and the positive terminal member 50 and further can be joined to each of the lid member 30 and the positive terminal member 50 and, for example, may also be another type of thermoplastic resin or different types of resin, such as thermosetting resin.

The negative-electrode resin member 80 is made of thermoplastic resin, specifically, polyphenylene sulfide (PPS) in the embodiment. The negative-electrode resin member 80 is joined to each of the lid member 30 and the negative terminal member 60. Since the negative-electrode resin member 80 is joined to the lid member and the negative terminal member 60, these lid member 30, negative terminal member 60, and negative-electrode resin member 80 are integrated as a unit. Thus, the battery 1 including this integrated unit constitutes a metal and resin composite. The negative-electrode resin member 80 hermetically seals and insulates between the lid member 30 and the negative terminal member 60. Specifically, the negative-electrode resin member 80 functions as a member for insulating and a member for sealing between the lid member 30 and the negative terminal member 60. The material of the negative-electrode resin member 80 may be selected from any materials that can hermetically seal and insulate between the lid member 30 and the negative terminal member 60 and further can be joined to each of the lid member 30 and the negative terminal member 60 and, for example, may also be another type of thermoplastic resin or different type of resin, such as thermosetting resin.

Figure 3:
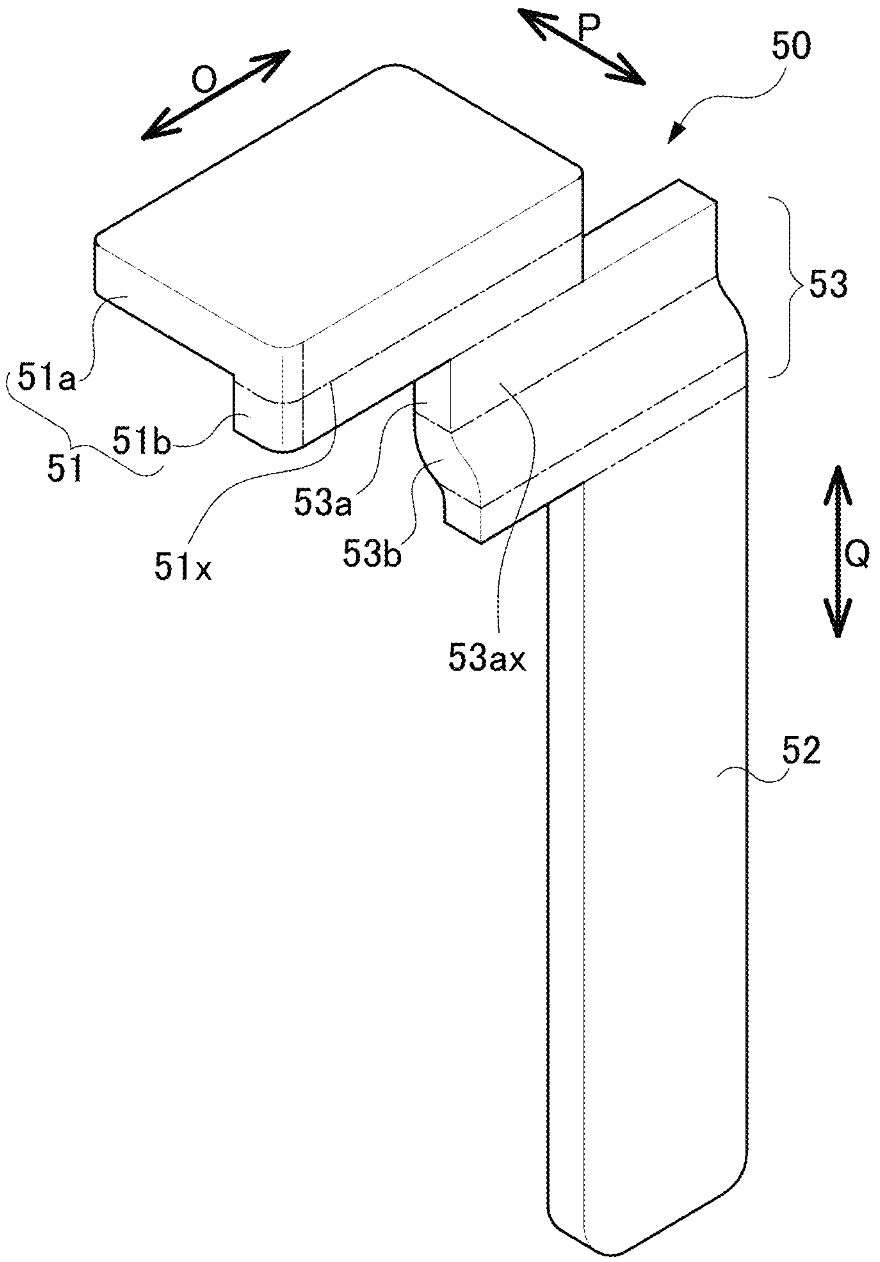
FIG. 3 is a perspective view of a positive terminal member.

Next, the shape of the positive terminal member 50 will be described in detail below. FIG. 3 is a perspective view of the positive terminal member 50. As shown in FIG. 3, the positive terminal member 50 includes a positive terminal upper part 51, a positive terminal lower part 52, and a positive terminal middle part 53. In the battery 1, the positive terminal upper part 51 is located relatively on the upper side U and the positive terminal lower part 52 is located relatively on the lower side D.

The positive terminal upper part 51 has an L-shaped cross-sectional shape constant in one direction. This cross-sectional shape of the upper part 51 is of an L shape with two straight sections, one is longer than the other. Therefore, of the positive terminal upper part 51, a rectangular plate-shaped portion corresponding to the longer straight section of the L-shaped cross-sectional shape is referred to as a long straight portion 51*a*, and a portion vertically extending from one edge of the long straight portion 51*a* is referred to as a short straight portion 51*b*.

In the following description, the positive terminal member 50 is described referring to the reference signs O, P, and Q each representing specific directions for convenience. To be specific, O denotes the direction in which the L-shaped cross-sectional shape of the positive terminal upper part 51 remains constant, P denotes the direction parallel to the long straight portion 51*a* of the L-shaped cross-sectional shape of the positive terminal upper part 51, and Q denotes the direction parallel to the short straight portion 51*b* of the L-shaped cross-sectional shape of the positive terminal upper part 51. Hereinafter, the reference signs O, P, and Q denoting the specific directions as above will also be referred to as a first direction O, a second direction P, and a third direction Q. Further, for explanation of the positive terminal member 50, one side in the third direction Q where the positive terminal upper part 51 is located may be referred to as an upper side, and the other side in the third direction Q where the positive terminal lower part 52 is located may be referred to as a lower side.

The positive terminal lower part 52 is formed entirely perpendicular to the long straight portion 51*a* and has a rectangular plate shape with a long side direction corresponding to the third direction Q and a short side direction corresponding to the second direction P. In the first direction O, a part of the positive terminal lower part 52 is located within the positive terminal upper part 51, but the rest part protrudes outside the positive terminal upper part 51. In the second direction P, a part of the positive terminal lower part 52 is located within the positive terminal upper part 51, but the rest part protrudes outside the positive terminal upper part 51.

The positive terminal middle part 53 has an overall crank shape that connects the positive terminal upper part 51 and the positive terminal lower part 52. When seen in the second direction P, the positive terminal middle part 53 has a rectangular shape with a long side direction corresponding to the first direction O and a short side direction corresponding to the third direction Q. The length of the positive terminal middle part 53 in the first direction O is longer than the length of the positive terminal lower part 52 in the first direction O. The side surface of the positive terminal lower part 52 at the protruding side from the positive terminal upper part 51 in the first direction O is continuous to, i.e., flush with, the side surface of the positive terminal middle part 53 on the same side.

Both surfaces of the positive terminal middle part 53, located near the short straight portion 51*b* and extending perpendicular to the second direction P, are flush with both surfaces of the short straight portion 51*b* perpendicular to the second direction P. Hereinafter, the portion of the positive terminal middle part 53, formed to be flush with the both surfaces of the short straight portion 51*b* perpendicular to the second direction P, will be referred to as an upper joining portion 53*a*. Further, the side surface 51*x* of the positive terminal upper part 51 including the short straight portion 51*b*, on the side where the positive terminal lower part 52 is located in the second direction P, is flush with the side surface 53*ax* of the upper joining portion 53*a* on the same side. On the opposite side of the upper joining portion 53*a* in the third direction Q from the short straight portion 51*b*, a bent portion 53*b* is formed in a crank shape bending outward in the second direction P relative to the positive terminal upper part 51.

In this embodiment, the shape of the negative terminal member 60 is identical to that of the positive terminal member 50. Accordingly, the details of the negative terminal member 60 are not described using a perspective view, but this negative terminal member 60 includes, as with the positive terminal member 50, a negative terminal upper part 61, a negative terminal lower part 62, and a negative terminal middle part 63, which are respectively identical to the positive terminal upper part 51, the positive terminal lower part 52, and the positive terminal middle part 53.

Figure 4:
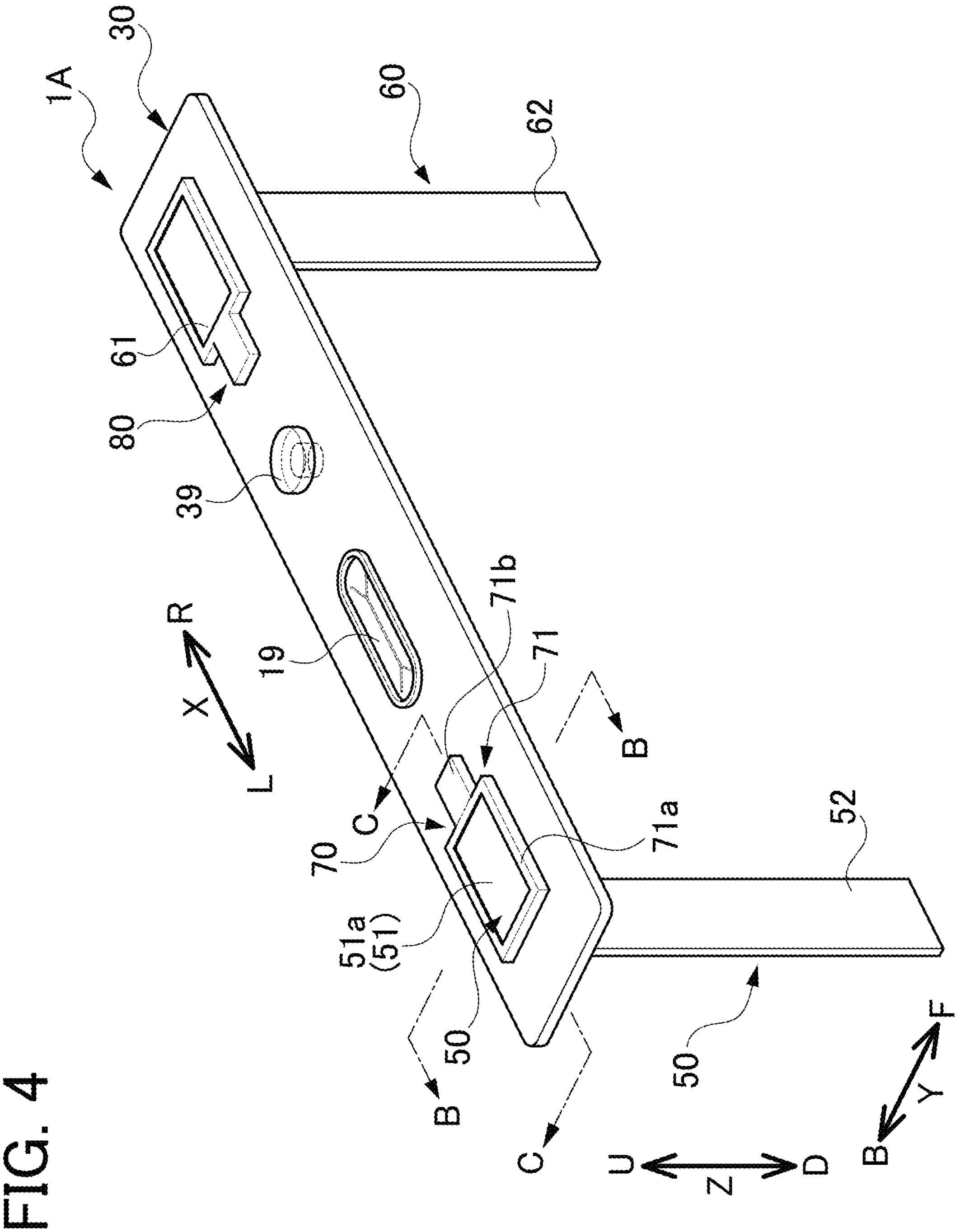
Figure 5A:
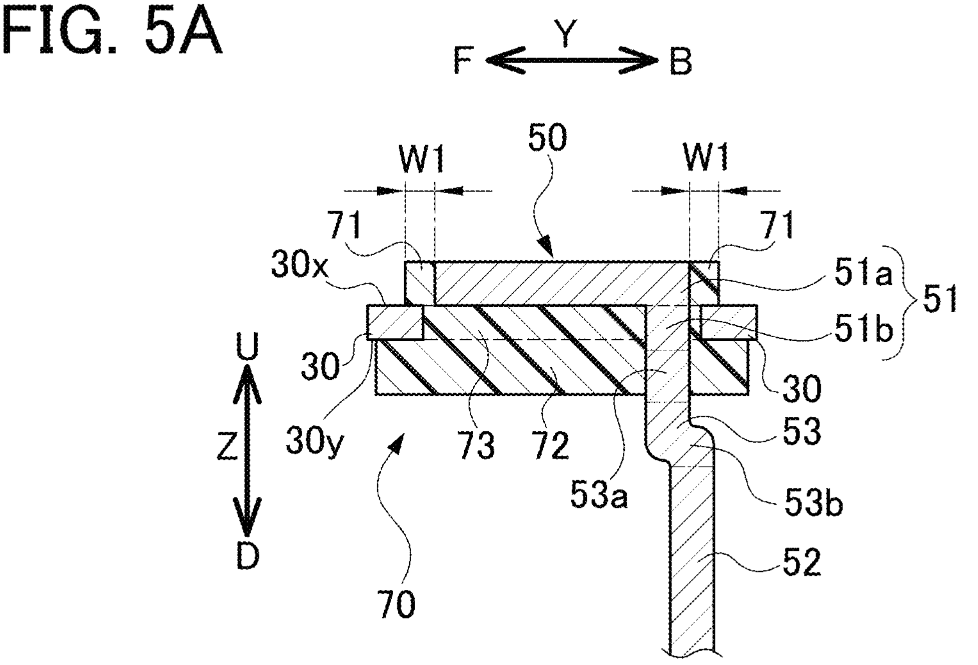
FIG. 5A is a cross-sectional view of the positive terminal member cut along a line B-B in FIG. 4.
Figure 5B:
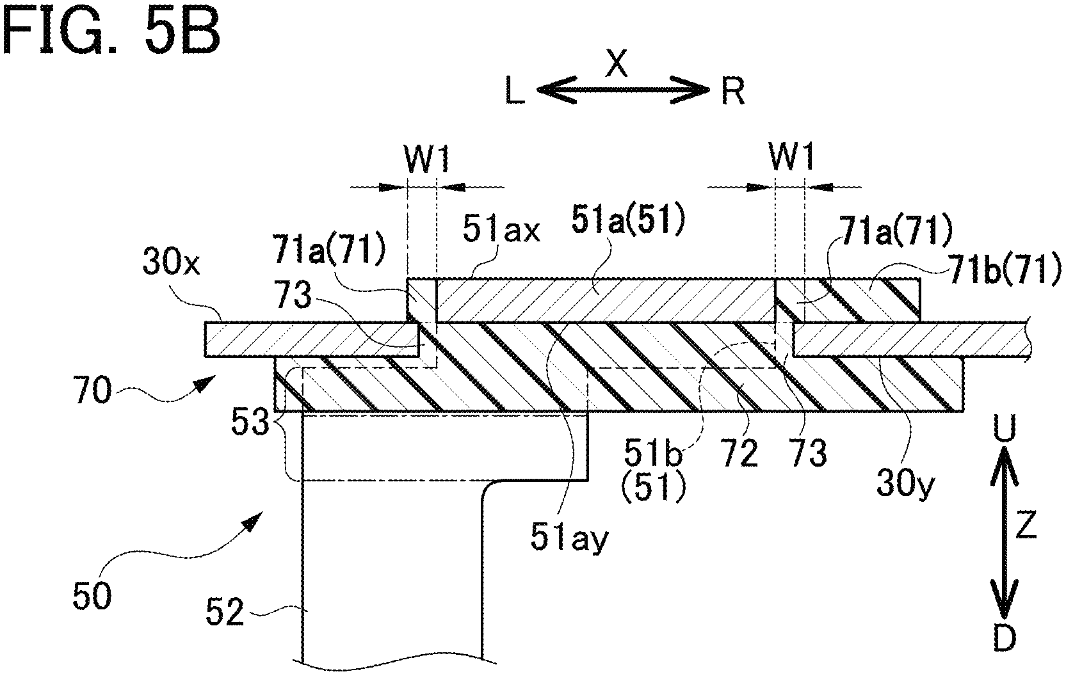
FIG. 5B is a cross-sectional view of the positive terminal member cut along a line C-C in FIG. 4.
Figure 6A:
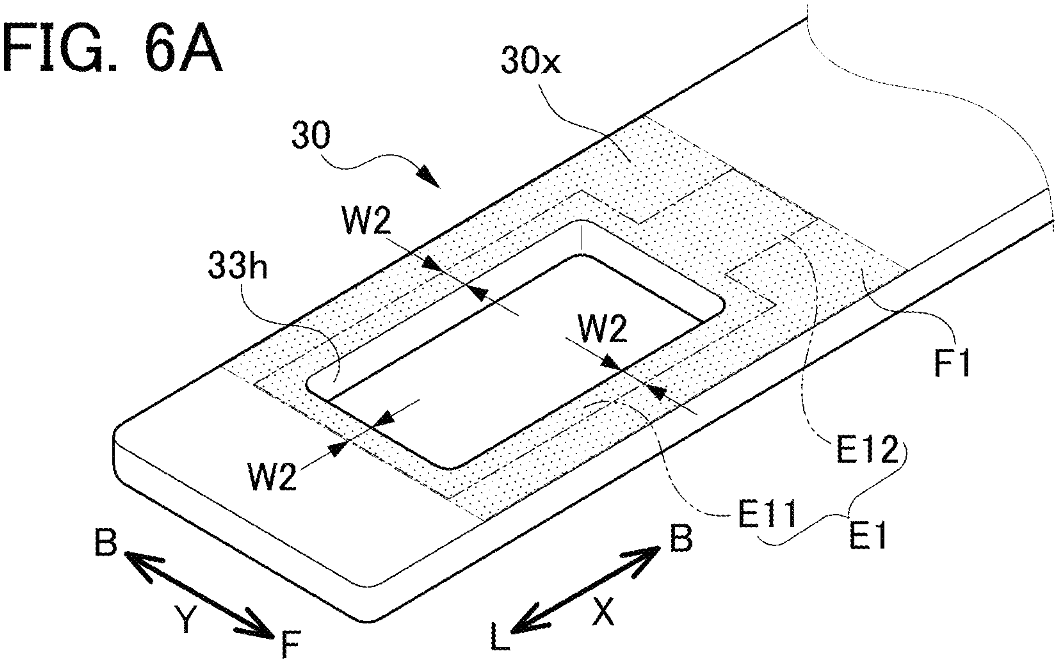
FIG. 6A is an explanatory view showing a joining region of an upper surface of a lid member, joined to a positive-electrode resin member, and a roughened region on the upper surface of the lid member.
Figure 6B:
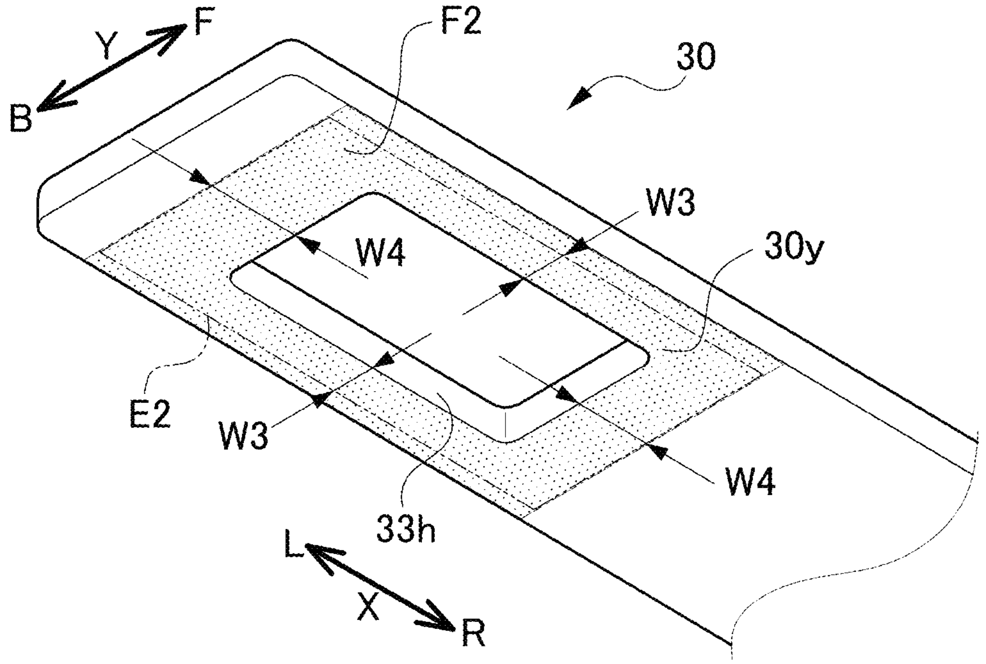
FIG. 6B is an explanatory view showing a joining region of a lower surface of the lid member, joined to the positive-electrode resin member and a roughened region on the lower surface of the lid member.
Figure 7A:
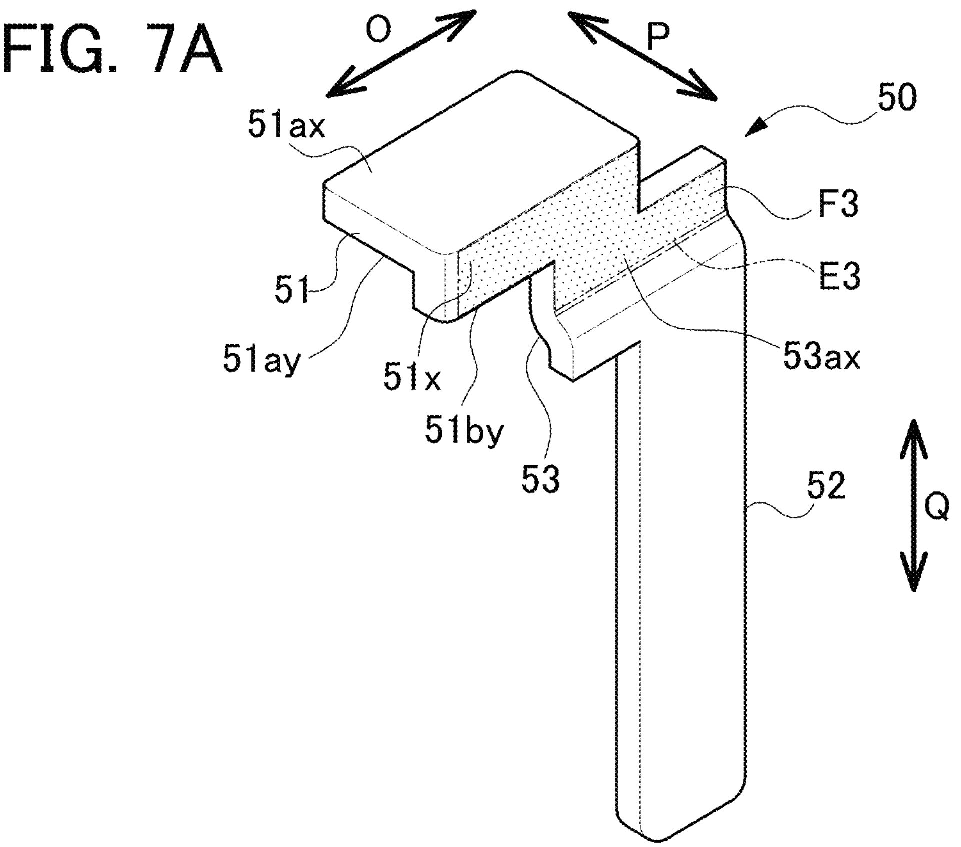
FIG. 7A is an explanatory view showing a joining region of a side surface of a part of the positive terminal member, joined to the positive-electrode resin member, and a roughened region on the side surface of the part of the positive terminal member.
Figure 7B:
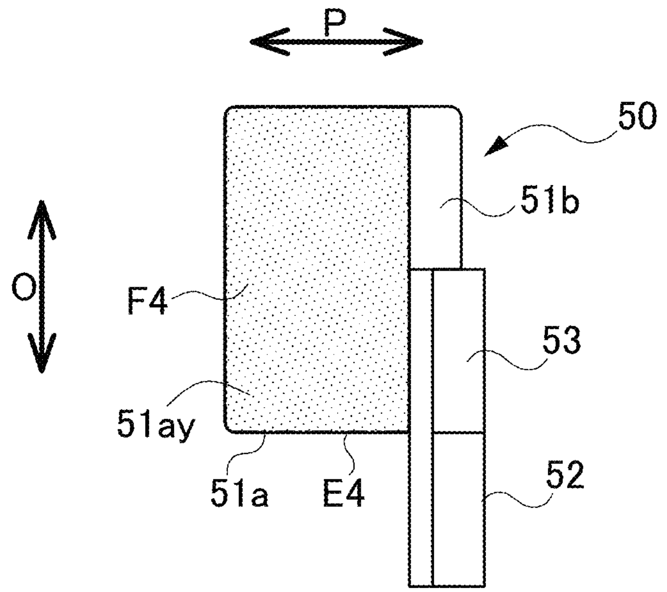
FIG. 7B is an explanatory view showing a joining region of a lower surface of a long straight portion of the positive terminal member, joined to the positive-electrode resin member and a roughened region on the lower surface of the long straight portion of the positive terminal member.

The joining structure of the positive-electrode resin member 70 to the lid member 30 and the positive terminal member 50, and the process of roughening the lid member 30 and the positive terminal member 50 will be described below. FIG. 4 is a perspective view showing a unit member 1A, which is a part of the battery 1 shown in FIGS. 1 and 2, and includes the lid member 30, the positive terminal member 50 and the positive-electrode resin member 70, and the negative terminal member 60 and the negative-electrode resin member 80, which are integrated. FIG. 5A is a cross-sectional view of the unit member 1A cut along a line B-B in FIG. 4 and FIG. 5B is a cross-sectional view of the same cut along a line C-C in FIG. 4. FIGS. 6A and 6B are explanatory diagrams showing the joining regions of the lid member 30 to be joined to the positive-electrode resin member 70 and the roughened regions of the lid member subjected to the roughening process. FIGS. 7A and 7B are explanatory diagrams showing the joining regions of the positive terminal member 50 to be joined to the positive-electrode resin member 70 and the roughened regions of the positive terminal member 50 subjected to the roughening process.

The positive terminal member 50 is fixed to the lid member 30 via the positive-electrode resin member 70 so that the first direction O is parallel to the right-left direction X and the positive terminal lower part 52 is placed on the back side B. On the other hand, the negative terminal member 60 is fixed to the lid member 30 via the negative-electrode resin member 80 so that the first direction O is parallel to the right-left direction X and the negative terminal lower part 62 is placed on the front side F.

The upper surface 51*ax* of the long straight portion 51*a* is exposed on the upper side U. The upper surface 30*x* of the lid member 30 and the lower surface 51*ay* of the long straight portion 51*a* are located on almost the same level in the upper-lower direction Z. Furthermore, the lower surface 51*by* of the short straight portion 51*b* is located slightly below the lower surface 30*y* of the lid member 30 in the upper-lower direction Z. In a plan view, i.e., when viewed from the upper side U toward the lower side D, the long straight portion 51*a* of the positive terminal member 50 inserted in the positive-electrode insertion hole 33*h* is located just inside the positive-electrode insertion hole 33*h*. In the right-left direction X and the front-back direction Y, the long straight portion 51*a* is located at almost the center of the positive-electrode insertion hole 33*h*.

The positive-electrode resin member 70 is formed extending from the upper end of the positive terminal upper part 51 to slightly above the lower end of the upper joining portion 53*a* in the upper-lower direction Z. This positive-electrode resin member 70 hermetically seals the space between the lid member 30 and the positive terminal member 50. In this embodiment, the positive-electrode resin member 70 is integrally formed by insert molding, as described below. For convenience, the portion of this resin member 70 located above the upper surface 30*x* of the lid member 30 is referred to as a positive-resin upper portion 71, the portion of the same located below the lower surface 30*y* of the lid member 30 is referred to as a positive-electrode lower portion 72, and the portion of the same located between the upper surface 30*x* and the lower surface 30*y* of the lid member 30, that is, the portion filling the positive-electrode insertion hole 33*h*, is referred to as a positive-electrode middle portion 73.

The positive-resin upper portion 71 includes a positive-resin upper frame portion 71*a* surrounding all around the long straight portion 51*a* and a positive-resin upper projecting portion 71*b* continuous to the upper frame portion 71*a*.

The positive-resin upper frame portion 71*a* is formed in a rectangular frame shape in plan view. The first width W1 of this upper frame portion 71*a*, from the inner edge to the outer edge, is approximately equal between the straight portions. The positive-resin upper projecting portion 71*b* is formed protruding on the right side R from an almost central part of the straight portion of the upper frame portion 71*a* on the right side R. The upper projecting portion 71*b* has a rectangular plate shape with a long side direction corresponding to the right-left direction X and a short side direction corresponding to the front-back direction Y. The lengths of the upper projecting portion 71*b* in the right-left direction X and in the front-back direction Y are longer than the first width W1. This upper projecting portion 71*b* is formed at a position to which a gate member GT (see FIG. 12) for injection of molten resin is disposed facing during insert molding.

The positive-resin upper frame portion 71*a* is joined to all the outer side surfaces of the long straight portion 51*a* and to a joining region E11 having a rectangular ring shape on the upper surface 30*x* of the lid member 30, which will be referred to as a lid upper-surface frame-shaped joining region E11, surrounding the edge of the positive-electrode insertion hole 33*h* over the entire circumference thereof. The second width W2 of this joining region E11, from the inner edge to the outer edge, is almost equal between the straight portions thereof. The positive-resin upper projecting portion 71*b* is joined, over its entire bottom surface, to the upper surface 30*x* of the lid member 30.

In the following description, the region on the upper surface 30*x* of the lid member 30 joined to the positive-resin upper projecting portion 71*b* is referred to as a lid upper-surface rectangular joining region E12. This joining region E12 is formed protruding on the right side R from almost the center part of the straight portion of the joining region E11 on the right side R. Thus, the lid upper-surface frame-shaped joining region E11 and the lid upper-surface rectangular joining region E12 are continuous to each other and constitute a joining region on the upper surface 30*x* of the lid member 30 to be joined to the positive-electrode resin member 70. Therefore, those joining regions E11 and E12 are referred together to as a lid upper-surface joining region E1.

The positive-resin lower portion 72 is formed wholly in a rectangular plate shape with a long side direction corresponding to the right-left direction X and a short side direction corresponding to the front-back direction Y. In this lower portion 72, a part of the positive terminal member 50, overlapping with the lower portion 72 in the upper-lower direction Z, is completely embedded. Thus, the lower portion 72 is joined to all the outer side surfaces of the overlapping parts of the short straight portion 51*b* and the upper joining portion 53*a* of the positive terminal member 50 in the upper-lower direction Z.

The positive-resin lower portion 72 is joined to a joining region E2 having a rectangular ring shape on the lower surface 30*y* of the lid member 30, which will be referred to as a lid lower-surface joining region E2, surrounding the edge of the positive-electrode insertion hole 33*h* over the entire circumference. For the distances from the inner edges to the outer edges of the straight portions of the joining region E2, the distances on the front side F and the back side B are almost equal and the distances on the left side L and the right side R are almost equal. Further, the fourth width W4 of this joining region E2, which is the distance from the inner edge to the outer edge of each straight portion on the left side L and the right side R is wider than the third width W3 of the joining region E2, which is the distance from the inner edge to the outer edge of each straight portion on the front side F and the back side B.

The positive-resin middle portion 73 is continuous to both the positive-resin upper portion 71 and the positive-resin lower portion 72. The middle portion 73 fills up the positive-electrode insertion hole 33*h* of the lid member 30 and thus this middle portion 73 is joined to all the inner side surfaces of the insertion hole 33*h*. Furthermore, in the middle portion 73, a part of the short straight portion 51*b* of the positive terminal member 50, overlapping with the middle portion 73 in the upper-lower direction Z, is completely embedded. Therefore, the middle portion 73 is joined to all the outer side surfaces of the overlapping part of the short straight portion 51*b* of the positive terminal member 50 in the upper-lower direction Z.

All the outer side surfaces of the long straight portion 51*a* of the positive terminal member 50 are joined to the positive-resin upper frame portion 71*a*. In the positive terminal member 50, an overlapping part of the short straight portion 51*b* with the positive-resin middle portion 73 and the positive-resin lower portion 72 in the upper-lower direction Z is joined, over its outer side surface, to those middle portion 73 and lower portion 72. Further, in the positive terminal member 50, an overlapping part of the upper joining portion 53*a* with the positive-resin lower portion 72 in the upper-lower direction Z is joined, over its outer side surface, to the lower portion 72. Therefore, in the positive terminal member 50, part of the side surfaces of the positive terminal upper part 51 and the upper joining portion 53*a*, which are continuous and flush with each other, and joined to the positive-electrode resin member 70, is referred to as a terminal side-surface joining region E3 (see FIG. 7A). Further, in the positive terminal member 50 on the side formed with the positive terminal lower part 52 in the third direction Q, a region joined to the positive-electrode resin member 70, that is, the entire lower surface 51*ay* of the long straight portion 51*a*, is referred to as a terminal lower-surface joining region E4 (see FIG. 7B).

As described above, each of the lid member 30 and the positive terminal 50 is provided with multiple joining regions joined to the positive-electrode resin member 70. Specified regions of the lid member 30 and the positive terminal member 50, including the joining regions joined to the resin member 70, have been subjected to a roughening process using a pulse laser in advance. This roughening process will be described below.

The roughening process is performed on the lid member 30, at a lid upper-surface roughened region F1 surrounding and covering the whole lid upper-surface joining region E1 on the upper surface 30*x* and at a lid lower-surface roughened region F2 surrounding and covering the whole lid lower-surface joining region E2 on the lower surface 30*y*. In addition, the roughening process is also performed on the positive terminal member 50, at a terminal side-surface roughened region F3 surrounding and covering the whole lid lower-surface joining region E3 extending over all the side surface of the positive terminal upper part 51 and the side surface of the upper joining portion 53*a*, which are continuous and flush with each other, and at a terminal lower-surface roughened region F4 coinciding with the terminal lower-surface joining region E4.

The method for roughening the lid upper-surface roughened region F1, lid lower-surface roughened region F2, terminal side-surface roughened region F3, and terminal lower-surface roughened region F4 is performed by pulse laser irradiation under the conditions described in detail later. In each of the roughened regions F1 and F2, a base layer 35 composed of debris particles accumulated in a planar form and a column group layer 36 composed of numerous nano columnar bodies 361 standing densely in two dimensions, which are formed of the debris particles bonding to one another in the form of strings of beads extending in the height direction. Similarly, in each of the roughened regions F3 and F4, a base layer 55 composed of debris particles accumulated in a planar form and a column group layer 56 composed of numerous nano columnar bodies 561 standing densely in two dimensions, which are formed of the debris particles bonding to one another in the form of strings of beads extending in the height direction. Specifically, the lid upper-surface joining region E1 and the lid lower-surface joining region E2, which are joined to the positive-electrode resin member 70 to seal between the outside and the inside of the battery 1, i.e., between the first space and the second space, in combination with the positive-electrode resin member 70, respectively include the lid upper-surface roughened region F1 and the lid lower-surface roughened region F2, each including the base layer 35 composed of debris particles accumulated in a planar form on the surface of the lid member 30 and the column group layer 36 composed of nano columnar bodies 361 standing densely in two dimensions, the nano columnar bodies 361 being formed of debris particles bonding to one another like strings of beads extending from the base layer 35 in the height direction. Similarly, the terminal side-surface joining region E3 and the terminal lower-surface joining region E4, which are joined to the positive-electrode resin member 70 to seal between the outside and the inside of the battery 1, i.e., between the first space and the second space, in combination with the positive-electrode resin member 70, respectively include the terminal side-surface roughened region F3 and the terminal lower-surface roughened region F4, each including the base layer 55 composed of debris particles accumulated in a planar form on the surface of the positive terminal member 50 and the column group layer 56 composed of the nano columnar bodies 561 standing densely in two dimensions, the nano columnar bodies 561 being formed of debris particles bonding to one another like strings of beads extending from the base layer 55 in the height direction.

The debris particles indicate particles with a diameter of 100 nm or less generated by pulse laser irradiation applied to the surface of a metal member, whereby part of the surface is explosively evaporated, the metal vapor or metal atoms react with atmospheric gas to form compounds or the like, which condense and fall on the surface near a pulse-laser irradiated site.

The average height of numerous nano columnar bodies 361 standing densely as the column group layer 36 in each of the lid upper-surface roughened region F1 and the lid lower-surface roughened region F2 and the average height of numerous nano columnar bodies 561 standing densely as the column group layer 56 in each of the terminal side-surface roughened region F3 and the terminal lower-surface roughened region F4 are 84 nm or more but less than 1000 nm.

The average of the surface area ratios of the lid upper-surface roughened region F1, lid lower-surface roughened region F2, terminal side-surface roughened region F3, and terminal lower-surface roughened region F4 is 12.9 or more. This surface area ratio in this embodiment is the value obtained by dividing the true surface area obtained by taking into account the asperities including the nano columnar bodies 361 and 561 in each roughened region F1 to F4 by the geometric surface area of each roughened region F1 to F4.

Figure 8:
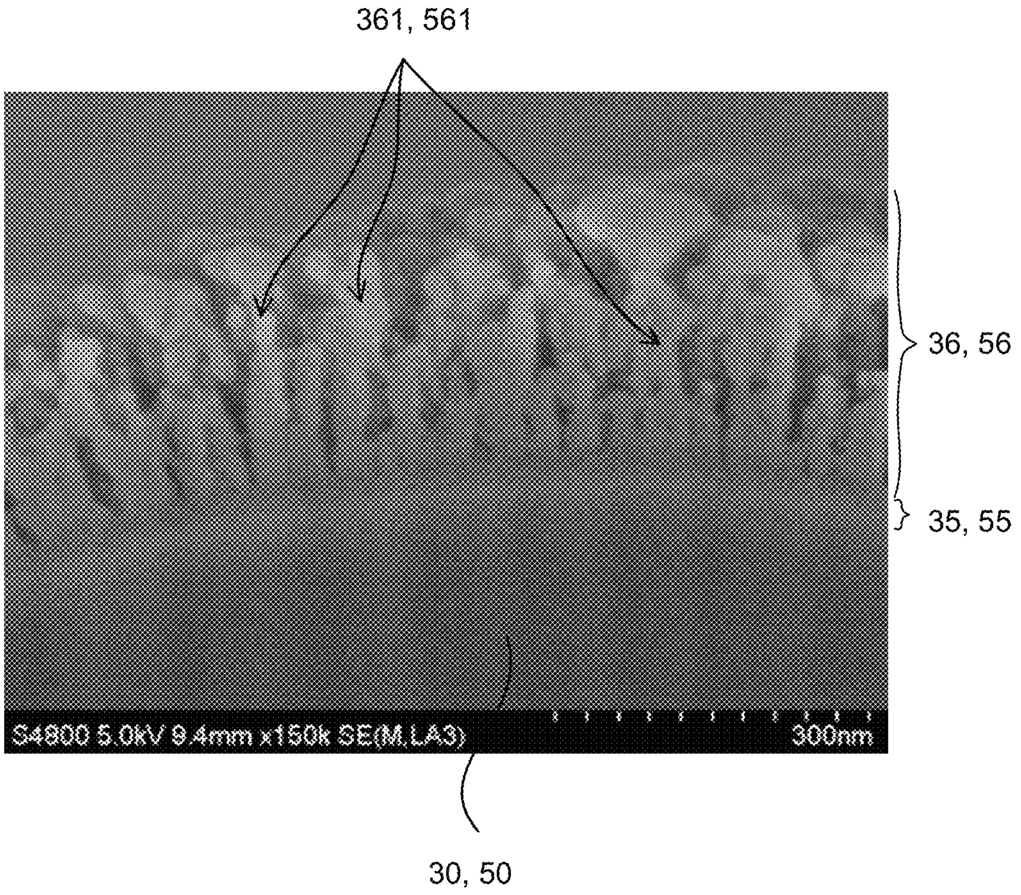
FIG. 8 is an image showing a base layer and a column group layer, which were actually formed.

Herein, FIG. 8 is an image showing that a metal member (the lid member 30, the positive terminal member 50) was actually subjected to the roughening process using pulse laser irradiation, and a base layer (the base layer 35, 55) and a column group layer (the column group layer 36, 56) were formed. As shown in FIG. 8, on the surface of the metal member (the lid member 30, the positive terminal member 50), the base layer (the base layer 35, 55) is formed as a layer of accumulated debris particles. Furthermore, on the base layer (the base layer 35, 55), the column group layer (the column group layer 36, 56) is formed as a layer of numerous nano columnar bodies (the nano columnar bodies 361, 561), which are formed of debris particles bonding to one another like strings of beads extending in the height direction, and stand densely in two dimensions. In FIG. 8, the scale at the bottom right corner in the image is marked in 30 nm increments.

Figure 9B:
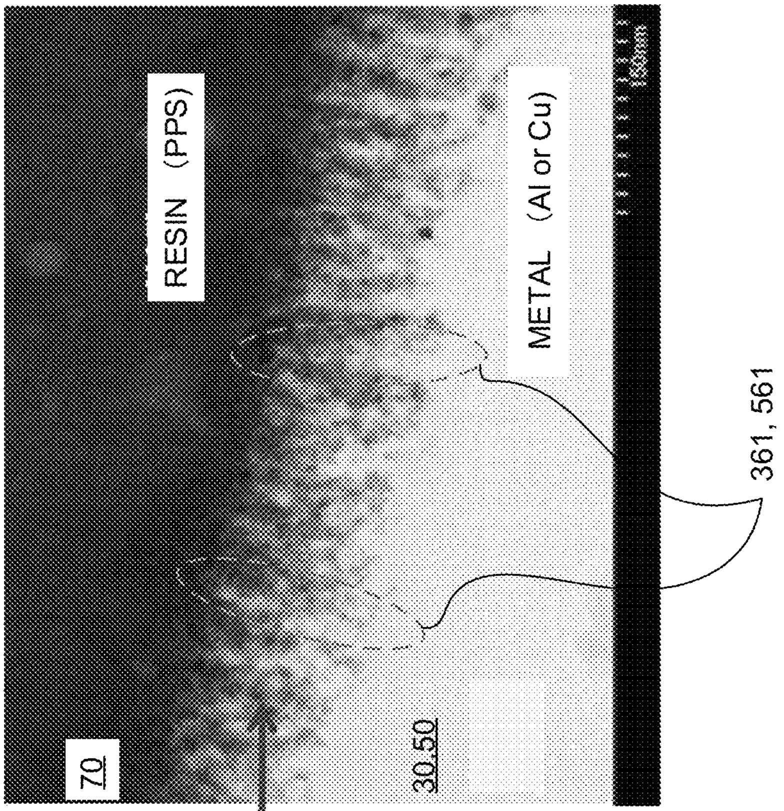
FIGS. 9A and 9B are images showing how resin (poly polyphenylene sulfide) for a positive-electrode resin member actually fills gaps between nano columnar bodies.
Figure 9A:
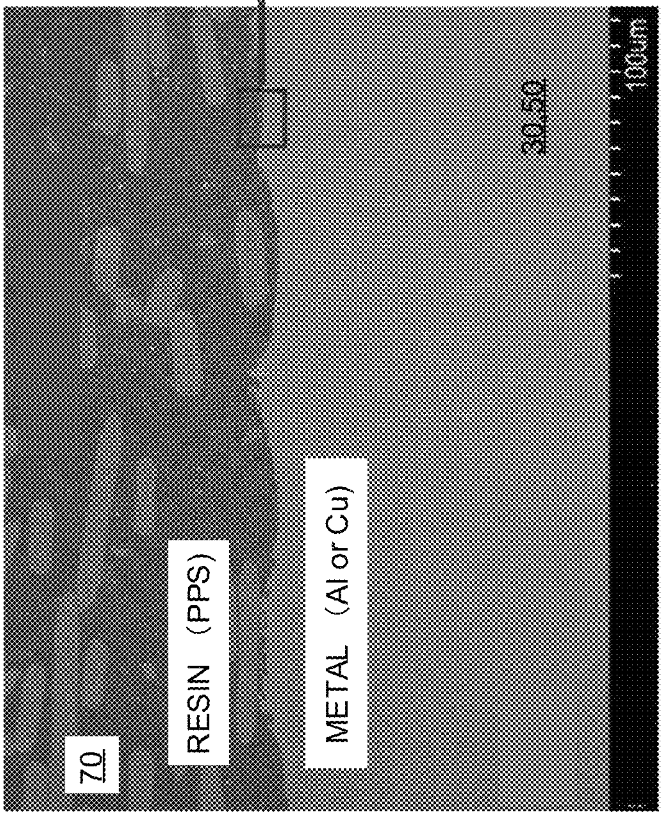

In the battery 1, the resin (polyphenylene sulfide) forming the positive-electrode resin member 70 is filled in the gaps between the nano columnar bodies 361 and between the nano columnar bodies 561 until reaching the base layer 35 and the base layer 55. In other words, the positive-electrode resin member 70 is joined to the surfaces of the nano columnar bodies 361 and 561 and the surfaces of the base layers and 55. Herein, FIGS. 9A and 9B are images showing how resin (poly polyphenylene sulfide) for forming the positive-electrode resin member 70 fills the gaps between numerous nano columnar bodies (the nano columnar bodies 361 and 561). In FIGS. 9A and 9B, the scale at the bottom right corner in FIG. 9A, i.e., the left image, is marked in 10 μm increments and the scale at the bottom right corner in FIG. 9B, i.e., the right image, is marked in 15 nm increments.

The joining structure of the negative-electrode resin member 80 to the lid member 30 and the negative terminal member 60 is configured similar to the joining structure of the positive-electrode resin member 70 to the lid member 30 and the positive terminal member 50 as described above referring to FIG. 5A to FIG. 9B. Further, the roughening process on the joining regions of the lid member 30 to be joined to the negative-electrode resin member 80 and the joining regions of the negative terminal member 60 to be joined to the negative-electrode resin member 80 is configured similar to the roughening process on the lid member 30 and the positive terminal member 50 as described above referring to FIG. 5A to FIG. 9B.

Production of Battery

Figure 10:
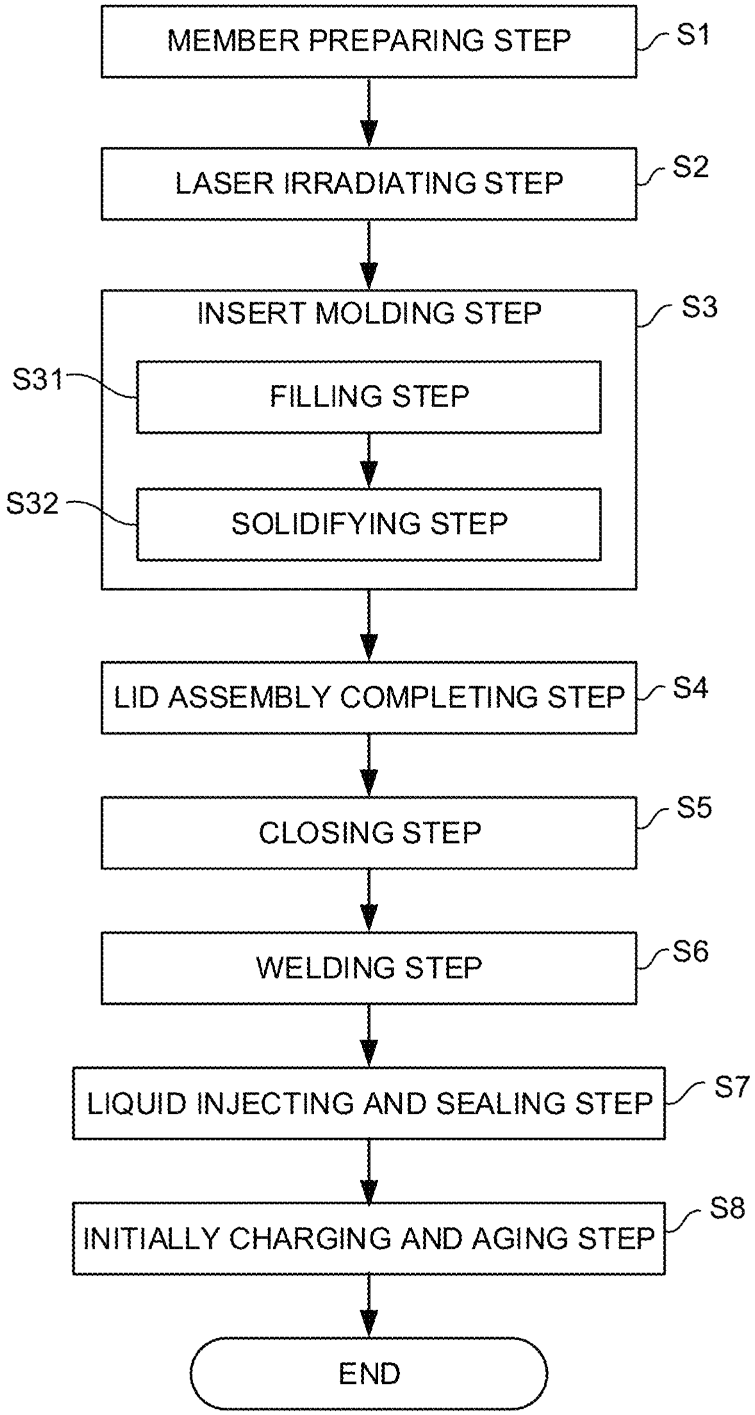
FIG. 10 is a flowchart of a method for producing the battery in the embodiment.

A method for producing the battery 1 will be described below referring to a flowchart of FIG. 10. This producing method for the battery 1 includes a component preparing step S1, a laser irradiating step S2, an insert-molding step S3, a lid assembly completing step S4, a closing step S5, a welding step S6, a liquid injecting and sealing step S7, and an initially charging and aging step S8.

In the component preparing step S1, the lid member 30, the positive terminal member 50, and the negative terminal member 60 are prepared. Specifically, the lid member 30 is made from an aluminum plate formed with the liquid inlet 30*k*, the positive-electrode insertion hole 33*h*, the negative-electrode insertion hole 34*h*, and the safety valve 19 by use of a conventional general machining method. The positive terminal member 50 is made from an aluminum plate into the shape shown in FIG. 3 by use of a conventional general machining method. Further, the negative terminal member 60 is made from a copper plate into the same shape as the positive terminal member 50 by use of the conventional general machining method.

Following the component preparing step S1, the laser irradiating step S2 is performed. In this laser irradiating step S2, the surfaces of the lid member 30, on which the base layers 35 and column group layers 36 are not formed yet and the lid upper-surface roughened region F1 and the lid lower-surface roughened region F2 are to be formed, are irradiated with a pulse laser, so that debris particles generated from the lid member 30 by pulse laser irradiation are accumulated and grow into numerous nano columnar bodies 361, forming the lid upper-surface roughened region F1 and the lid lower-surface roughened region F2. Similarly, in the laser irradiating step S2, the surfaces of the positive terminal member 50, on which the base layers 55 and the column group layers 56 are not formed yet and the terminal side-surface roughened region F3 and the terminal lower-surface roughened region F4 are to be formed, are irradiated with a pulse laser, so that debris particles generated from the positive terminal member 50 by pulse laser irradiation are accumulated and grow into numerous nano columnar bodies 561, forming the terminal side-surface roughened region F3 and the terminal lower-surface roughened region F4.

Figure 11A:
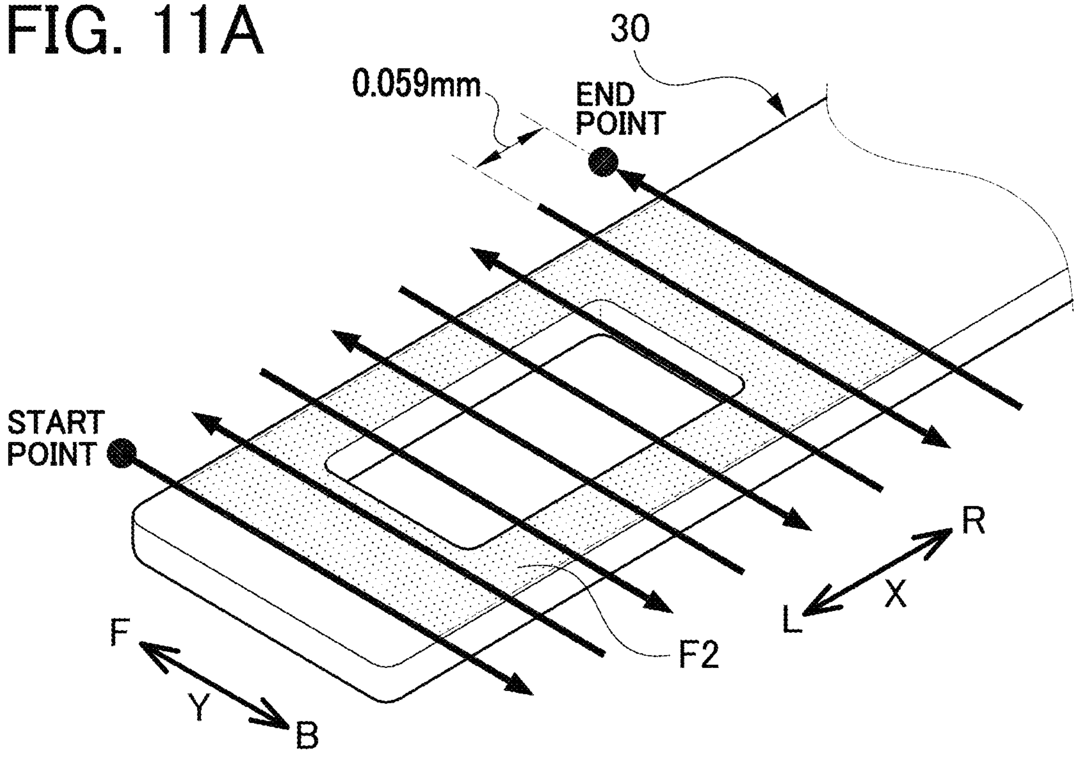
FIG. 11A is a schematic diagram showing a roughening process on a lid lower-surface roughened region.
Figure 11B:
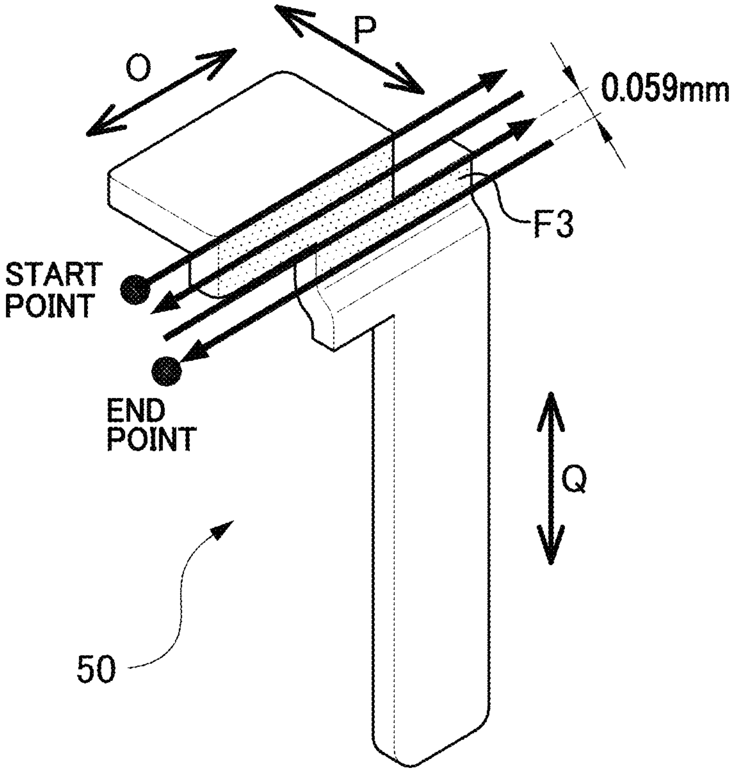
FIG. 11B is a schematic diagram showing a roughening process on a terminal side-surface roughened region.

One example of various conditions of the pulse laser irradiation in the laser irradiating step S2 is as below. The energy density of one pulse of laser irradiation is set to 24 $J/cm^2$ for aluminum and 32 $J/cm^2$ for copper. For example, other laser irradiation conditions for aluminum are set such that a wavelength is 1060 nm, an average output power is 25 W, a pulse period is 40 μs, a pulse width is 50 ns, a spot diameter is 63 μm, a moving speed of a laser beam is 1450 mm/s, and a line pitch is 0.059 mm. FIGS. 11A and 11B are schematic diagram showing the trajectory of a laser beam during the pulse laser irradiation performed on the lid lower-surface roughened region F2 and the terminal side-surface roughened region F3 in the laser irradiating step S2.

As shown in FIG. 11A, the lid lower-surface roughened region F2 is irradiated with a pulse laser beam that is advanced from one end of the region F2 on one side (the left side L in FIG. 11A) in the right-left direction X, which is the side indicated by "START POINT" in FIG. 11A, to one side in the front-back direction Y (the back side B in FIG. 11A). Successively, the pulse laser beam is shifted toward the other side in the right-left direction X (the right side R in FIG. 11A) by a set line pitch (0.059 mm) and is advanced again to irradiate the region F2 toward the other side in the front-back direction Y (the front side F in FIG. 11A). Further, the pulse laser beam is shifted toward the other side in the right-left direction X (the right side R in FIG. 11A) by the set line pitch (0.059 mm) and is advanced again to irradiate the region F2 toward the one side in the front-back direction Y (the back side B in FIG. 11A). Thereafter, this pulse laser irradiation is repeatedly performed by advancing the laser beam to one side or the other side in the front-back direction Y until reaching an end of the region F2 on the other side (the right side R in FIG. 11A) in the right-left direction X, which is the side indicated by "END POINT" in FIG. 11A.

When the pulse laser irradiation is performed on the lid lower-surface roughened region F2, the base layer 35 and the column group layer 36 are formed in this region F2. Firstly, the debris particles generated from the lid member 30 adhere to the surface of the lid member 30 in a scattered manner to form the planar-shaped base layer 35. Secondly, as more debris particles progressively adhere in the scattered manner, the debris particles bond onto the base layer 35, resulting in numerous short protruding nano columnar bodies 361 extending in the height direction and standing densely in two dimensions. As more debris particles further adhere in the scattered manner, the debris particles bond to one another like strings of beads on the base layer 35, so that numerous long nano columnar bodies 361 further extending in the height direction stand densely in two dimensions. For example, the nano columnar bodies 361 can be formed with a high average height by increasing the energy density of pulse laser irradiation.

The starting position of the pulse laser irradiation on the lid lower-surface roughened region F2 is not limited to on the side marked with START POINT in FIG. 11A, but may be on the side marked with END POINT in FIG. 11A. The pulse laser irradiation on the lid upper-surface roughened region F1 is also performed in the same manner as the pulse laser irradiation on the lid lower-surface roughened region F2 as illustrated in FIG. 11A. However, the laser irradiation for the lid upper-surface roughened region F1 and the laser irradiation for the lid lower-surface roughened region F2 may be performed in different manners.

As shown in FIG. 11B, the terminal side-surface roughened region F3 is irradiated with a pulse laser beam that is advanced from one end of the region F3 on one side in the third direction Q of the positive terminal member 50, which is the side indicated by "START POINT" in FIG. 11B, to one side of the positive terminal member 50 in the first direction O. Successively, the pulse laser beam is shifted toward the other side of the positive terminal member 50 in the third direction Q by a set line pitch (0.059 mm) and is advanced again to irradiate the region F3 toward the other side in the first direction O. Then, the pulse laser beam is further shifted toward the other side of the positive terminal member 50 in the third direction Q by the set line pitch (0.059 mm) and is advanced again to irradiate the region F3 toward the one side in the first direction O. Thereafter, this pulse laser irradiation is repeatedly performed by advancing the laser beam to one side or the other side in the first direction O until reaching an end of the region F3 on the other side in the third direction Q, which is the side indicated by "END POINT" in FIG. 11B.

When the pulse laser irradiation is performed on the terminal side-surface roughened region F3, the base layer 55 and the column group layer 56 are formed. Firstly, the debris particles generated from the positive terminal member 50 adhere to the surface of the positive terminal member 50 in a scattered manner to form the planar-shaped base layer 55. Secondly, as more debris particles progressively adhere in the scattered manner, the debris particles bond onto the base layer 55, resulting in numerous short protruding nano columnar bodies 561 extending in the height direction and standing densely in two dimensions. As more debris particles further adhere in the scattered manner, the debris particles bond to one on another like strings of beads on the base layer 35, so that numerous long nano columnar bodies 561 further extending in the height direction stand densely in two dimensions. For example, the nano columnar bodies 561 can be formed with a high average height by increasing the energy density of pulse laser irradiation.

The starting position of the pulse laser irradiation on the terminal side-surface roughened region F3 is not limited to on the side marked with START POINT in FIG. 11B, but may be on the side marked with END POINT in FIG. 11B. The pulse laser irradiation on the terminal lower-surface roughened region F4 is also performed in the same manner as the pulse laser irradiation on the terminal side-surface roughened region F3 as illustrated in FIG. 11B. In this case, however, the advancing direction of the pulse laser beam is the same as that for the terminal side-surface roughened region F3, but the starting position and the ending position of the pulse laser irradiation are respectively set to an end on one side and an end on the other side of the terminal lower-surface roughened region F4 in the first direction O of the positive terminal member 50. Furthermore, the pulse laser beam is shifted by a set line pitch (0.059 mm) toward one side or the other side in the second direction P.

In the laser irradiating step S2, additionally, the pulse laser irradiation is performed on the joining region of the lid member 30 around the negative-electrode insertion hole 34*h* to the negative-electrode resin member 80 in almost the same manners as for the lid upper-surface roughened region F1 and the lid lower-surface roughened region F2. Similarly, the pulse laser irradiation is performed on the joining region of the negative terminal member 60 to the negative-electrode resin member 80 in almost the same manners as for the terminal side-surface roughened region F3 and terminal lower-surface roughened region F4. The above term, "almost the same manners", represents the regions to be subjected to pulse laser irradiation and the pulse laser irradiation conditions.

Figure 12:
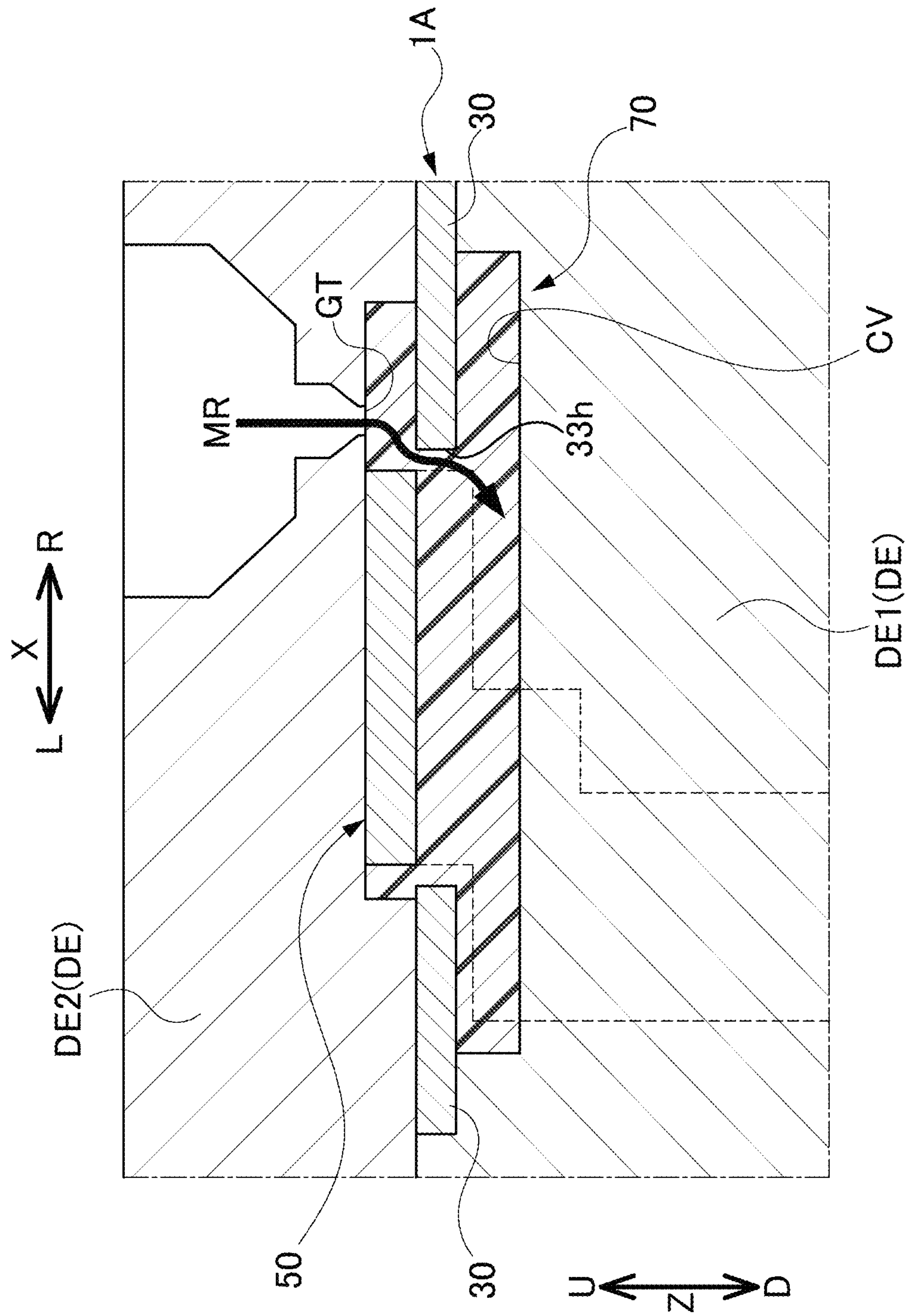
FIG. 12 is a schematic diagram showing an insert-molding process.

After the laser irradiating step S2, the insert molding step S3 is performed. In the insert molding step S3, the positive-electrode resin member 70 and the negative-electrode resin member 80 are formed, so that the positive-electrode resin member 70 is integrally joined to the lid member 30 and the positive terminal member 50 and the negative-electrode resin member 80 is integrally joined to the lid member 30 and the negative terminal member 60. That is, the unit member 1A, which is a metal-resin composite, is produced. FIG. 12 is an explanatory diagram schematically showing the insert molding step S3 for the positive terminal member 50.

In the insert molding step S3, a mold DE is used, including a lower mold DE1 placed on the lower side and an upper mold DE2 placed on the upper side. These lower mold DE1 and upper mold DE2 are set in place first, and then the lid member 30, the positive terminal member 50, and the negative terminal member 60 are put in respective predetermined positions. At that time, the positive terminal member 50 inserted in the positive-electrode insertion hole 33*h*, the negative terminal member 60 inserted in the negative-electrode insertion hole 34*h*, and the lid member 30 are integrally supported by the mold DE. Further, the lower mold DE1 and the upper mold DE2 set in place to form a cavity CV corresponding to each of the positive-electrode resin member 70 and the negative-electrode resin member 80.

In the insert molding step S3, specifically, a filling step S31 is performed first and then a solidifying step S32 is performed. In the filling step S31, as shown in FIG. 12, molten resin MR, which will form the positive-electrode resin member 70 and the negative-electrode resin member 80, is injected from a gate member GT into the cavity CV formed by the lower mold DE1 and the upper mold DE2 through the upper mold DE2. At that time, for example, the molten resin MR is injected to fill the gaps between numerous nano columnar bodies 361, which form the column group layer 36, until reaching the base layer 35. Similarly, the molten resin MR is injected to fill the gaps between nano columnar bodies 561, which form the column group layer 56, until reaching the base layer 55.

The materials of the positive-electrode resin member 70 and the negative-electrode resin member 80 are primarily composed of polyphenylene sulfide. Further, the materials of the positive-electrode resin member 70 and the negative-electrode resin member 80 contain glass fillers. The linear expansion coefficient of the materials of the positive-electrode resin member 70 and the negative-electrode resin member 80 are set to a value between the linear expansion coefficient of copper (1.65) and the linear expansion coefficient of aluminum (2.31).

After injection of the molten resin MR, the solidifying step S32 is performed by appropriately cooling the molten resin MR to form the positive-electrode resin member 70 and the negative-electrode resin member 80. In detail, for example, the molten resin MR is filled into the gaps between the numerous nano columnar bodies 361 until reaching the base layer 35 and also filled into the gaps between the numerous nano columnar bodies 561 until reaching the base layer 55 in the filling step S31, and the molten resin MR is then solidified, forming the positive-electrode resin member 70 joined to the joining regions E1 to E4 respectively including the roughened regions F1 to F4. Similarly, the negative-electrode resin member 80 is also formed. Subsequently, the upper mold DE2 is moved upward, and the unit member 1A integrally composed of the lid member 30, the positive-electrode resin member 70 and the positive terminal member 50, and the negative-electrode resin member 80 and the negative terminal member 60 is taken out from the lower mold DE1.

After the insert molding step S3, the lid assembly completing step S4 is performed to complete the lid assembly. Specifically, the electrode body 40 is prepared, and the positive terminal lower part 52 and the negative terminal lower part 62 of the unit member 1A produced in the insert molding step S3 are respectively connected by welding to the positive current collecting part 41*r* and the negative current collecting part 42*r* of the electrode body 40. The electrode body 40 in this state is then enclosed with the pouched-shaped insulating holder 5. Accordingly, the lid assembly consisting of the lid member 30, positive terminal member 50, negative terminal member 60, positive-electrode resin member 70, negative-electrode resin member 80, electrode body 40, and insulating holder 5 is completed.

Following the lid assembly completing step S4, the closing step S5 is performed. In this closing step S5, the case body 20 is prepared, and a lower part of the lid assembly completed in the lid assembly completing step S4, located under the lid member 30, including the electrode body 40 and the insulating holder 5, is inserted in the case body 20, and then the opening 21 of the case body 20 is closed with the lid member 30.

After the closing step S5, the welding step S6 is performed. In this welding step S6, each end portion of the front side part 13, back side part 14, left side part 15, and right side part 16 of the case body 20, on the upper side U in the upper-lower direction Z, is laser welded to the peripheral edge portion of the lid member 30 over the entire circumference to hermetically seal the opening 21.

After the welding step S6, the liquid injecting and sealing step S7 is performed, in which the electrolyte 3 is injected, or poured, into the case 10 through the liquid inlet 30*k*, so that the electrode body 40 is impregnated with the electrolyte 3. Then, the sealing member 39 is fitted into the liquid inlet 30*k* from above and welded to the lid member 30 over the entire circumference to hermetically seal between the sealing member 39 and the lid member 30.

Following the liquid injecting and sealing step S7, the initial charging and aging step S8 is performed, in which the battery 1 is connected to a charging device (not shown) and initially charged. This initially charged battery 1 is then left to stand for a predetermined time to age. Thus, the battery 1 is completed.

Next, the experiment to verify the sealing properties of the joined portions of a metal member and a resin member will be described below. This experiment was carried out by the applicants. This experiment is referred to as a sealing-property verification experiment. This verification experiment includes three steps (1) to (3) listed below:

(1) Production of test pieces to be tested;

(2) Implementation of a liquid type thermal shock test; and (3) Implementation of a helium leak test.

Figure 13A:
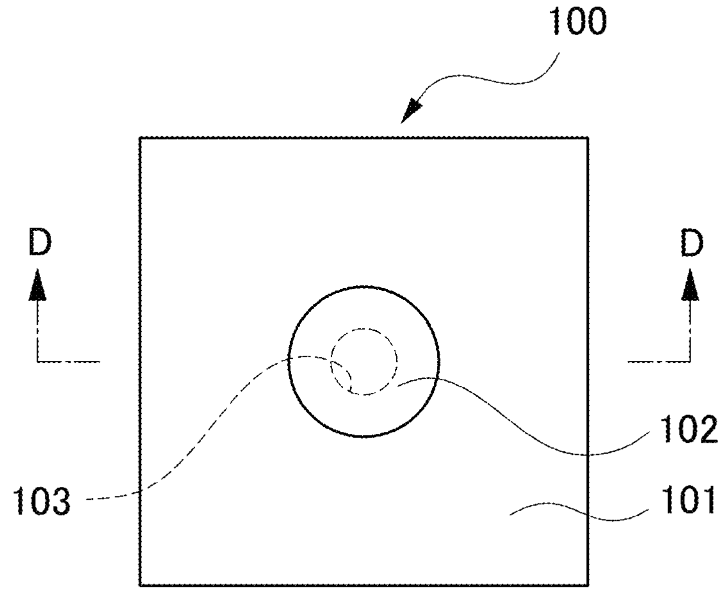
FIGS. 13A and 13B are explanatory diagrams schematically showing a test piece.
Figure 13B:
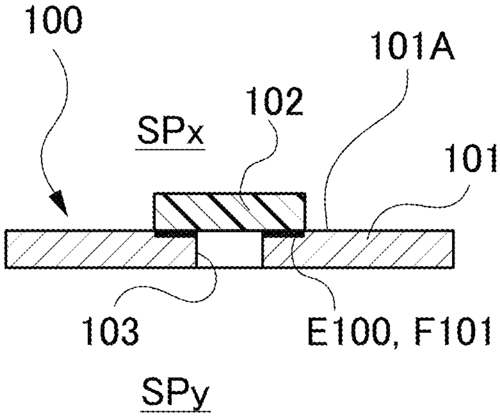

The production of test pieces (1) is first described below. The test pieces are substances to be subjected to the sealing-property verification experiment. FIGS. 13A and 13B are explanatory diagrams schematically showing a test piece 100. Specifically, FIG. 13A is a plan view of the test piece 100 and FIG. 13B is a cross-sectional diagram of the test piece 100 cut along a D-D line in FIG. 13A. The test piece 100 is composed of a plate-shaped metal member 101 and a resin member 102, which are joined to each other. The plate-shaped metal member 101 is made of aluminum or copper. Specifically, as the test pieces 100, multiple plate-shaped metal members made of aluminum and multiple plate-shaped metal members made of copper are prepared. The resin member 102 is made of only polyphenylene sulfide (PPS).

The plate-shaped metal member 101 is formed in an overall square, irrespective of the types of metal members. In the center of the metal member in plan view, a venthole 103 is formed penetrating through the metal member 101 in its thickness direction.

On the surface 101A of the metal member 101 on the side joined to the resin member 102, a roughened region F101 is formed. The shape of the roughened region F101 is a circular ring-shape surrounding the edge of the venthole 103 with an appropriate constant width. In this roughened region F101, similar to the foregoing roughened regions F1 to F4, a base layer and a column group layer are formed by the pulse laser irradiation. However, in the sealing-property verification experiment, multiple test pieces 100 were prepared and subjected to the pulse laser irradiation under different conditions for each test piece. Accordingly, the average height and the surface area ratio of the nano columnar bodies are different for each test piece. FIG. 14 is a table showing the relationship between various conditions of the pulse laser irradiation performed on the roughened regions F101 and the average height and the surface area ratio of the nano columnar bodies formed in the roughened regions F101. In this sealing-property verification experiment, seven metal members 101 made of aluminum and seven metal members 101 made of copper were prepared.

The resin members 102 are joined one to each of the metal members 101 by insert molding. Each resin member 102 has a circular plate shape. In each test piece 100, the central axis of the resin member 102 and the central axis of the venthole 103 are substantially coincident. In the present experiment, therefore, a joining region E100 of the metal member 101 joined to the resin member 102 is coincident with the roughened region F101 of the metal member 101. This shows that the resin member 102 is joined to the roughened region F101 around the venthole 103 over its entire circumference while covering over the venthole 103. In other words, in the present experiment, the joined portion of each test piece 100, where the resin member 102 and the metal member 101 are joined together, seals between the space on one side of the metal member 101 joined to the resin member 102, i.e., a first space SPx, and the space on the other side of the metal member 101 not joined to the resin member 102, i.e., a second space SPy.

Next, the liquid type thermal shock test (2) will be described. The liquid type thermal shock test was conducted on each test piece 100 using an off-the-shelf liquid type thermal shock device (ES-96EXH-LS, Hitachi Appliances, Inc.).

Finally, the helium leak test (3) will be described. The well-known helium leak test was conducted on each test piece 100 having been subjected to the liquid type thermal shock test, using an off-the-shelf helium leak detector (HELIOT900, ULVAC Inc.)

Figure 15A:
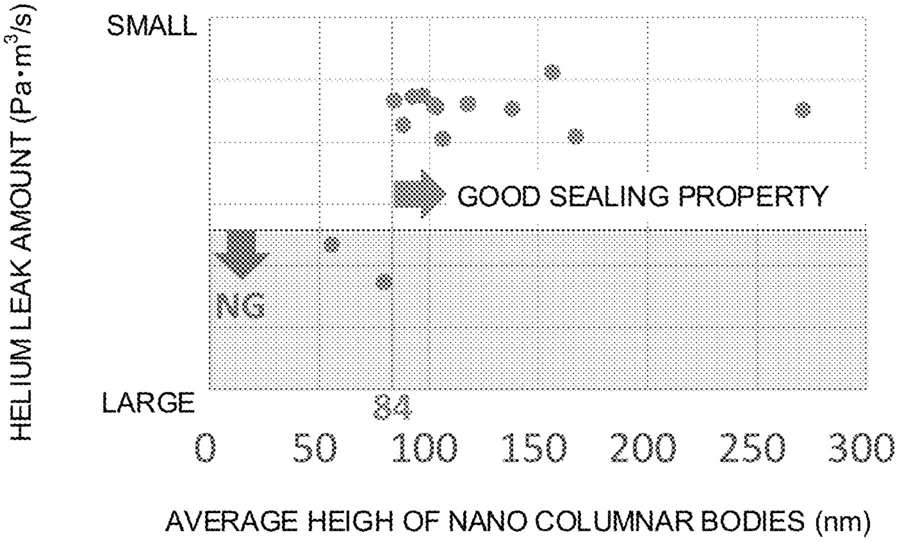
FIG. 15A is a scatter plot with the horizontal axis as the average height of the nano columnar bodies and the vertical axis as helium leakage amount.
Figure 15B:
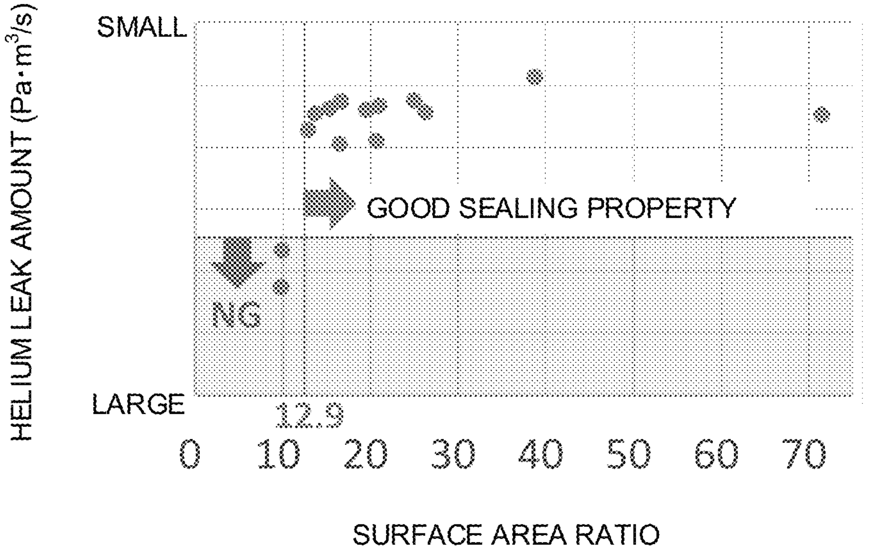
FIG. 15B is a scatter plot with the horizontal axis as a surface area ratio and the vertical axis as a helium leakage amount.

The results of the helium leak test (3) are shown in FIGS. 15A and 15B. FIG. 15A is a scatter plot with the horizontal axis indicating the average height of the nano columnar bodies and the vertical axis indicating the helium leak amount. FIG. 15B is a scatter plot with the horizontal axis indicating the surface area ratio and the vertical axis indicating the helium leak amount. The vertical axes in FIGS. 15A and 15B show that the helium leak amount is smaller upward. As shown in FIGS. 15A and 15B, in the sealing-property verification experiment, when the average height of the nano columnar bodies is 84 nm or more, or, when the surface area ratio of the nano columnar bodies is 12.9 or more, the sealing properties of the joined portions where the metal member 101 and the resin member 103 are joined was found to be good. In FIGS. 15A and 15B, a label "NG" represents that the sealing properties are not good.

Herein, the method of calculating the average height of the nano columnar bodies in each roughened region in the sealing-property verification experiment is described below. In this calculation method, plate-shaped metal members are prepared first as test pieces. These test pieces, formed of the metal members, are referred to as "average height test pieces". The pulse laser irradiation is performed on the entire one surface of each of the average height test pieces under various conditions.

Next, a cross-section specimen is prepared from each of the average height test pieces, including a portion of the plane having been subjected to pulse laser irradiation, by use of a predetermined cross-section specimen preparing machine (e.g., Cross Section Polisher (registered trademark), manufactured by JEOL Ltd.). The cross-section specimens are parallel to the thickness direction of the average height test pieces. Subsequently, a cross-sectional image of each of the cross-section specimens is obtained using a scanning electron microscope (S-4800, Hitachi High-Technologies Corporation). Each of the cross-sectional images has a magnification of 150000×.

Then, the area of a cross-section (the cross-sectional area) and the base end line length of the nano columnar bodies in each cross-sectional image are measured by a well-known image processing software. The height of the nano columnar bodies is calculated by the following expression 1.

$$\text{Height of nano columnar bodies (nm)} = \text{Cross-sectional area of nano columnar bodies } (\text{nm}^2) \div \text{Base end line length (nm)} \qquad \text{Expression 1}$$

Figure 16A:
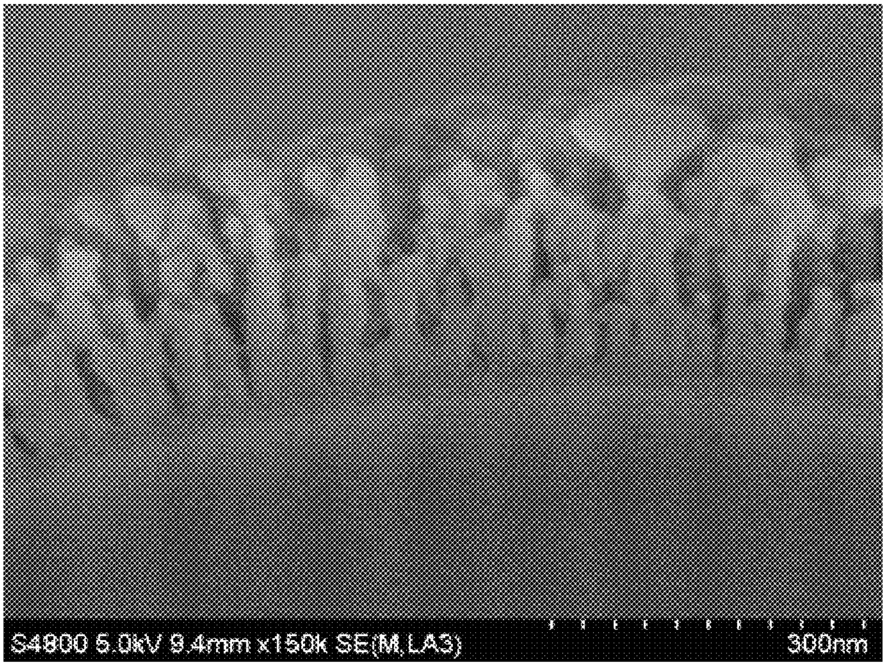
FIG. 16A is one example of a cross-sectional image of a cross-section specimen obtained using a scanning electron microscope.
Figure 16B:
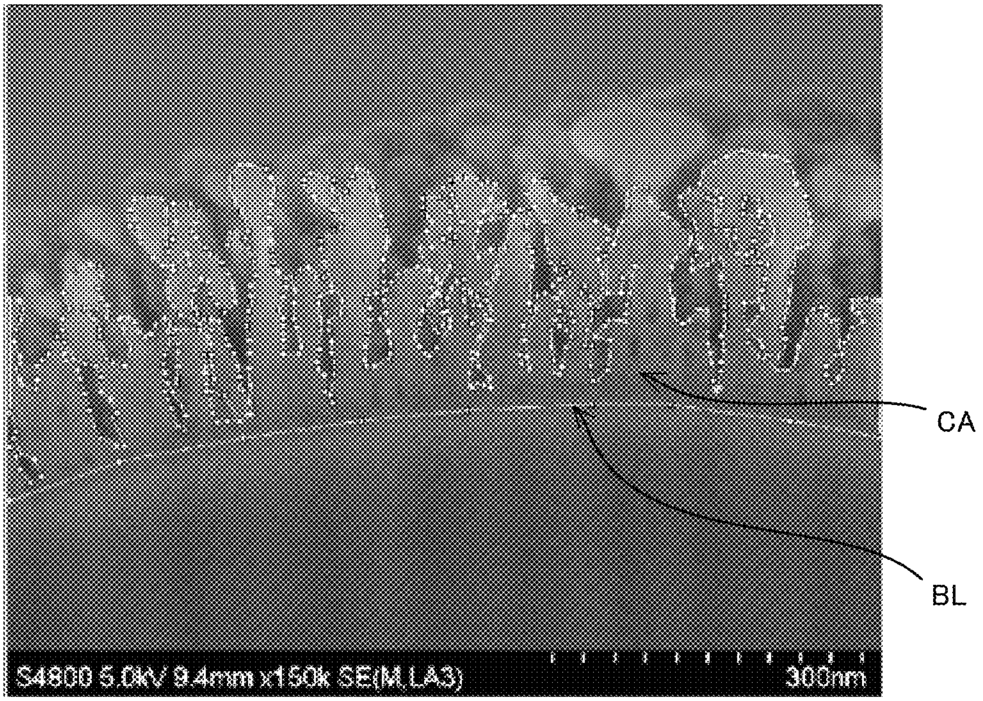
FIG. 16B is an explanatory diagram showing the cross-sectional area and the base end line length of the nano columnar bodies based on FIG. 16A.

FIG. 16A is one example of the cross-sectional image obtained using the scanning electron microscope. FIG. 16B is an explanatory diagram showing the cross-sectional area CA and the based end line length BL of the nano columnar bodies based on FIG. 16A. As shown in FIG. 16B, the length of a curved line is the base end line length BL and the total area of the densely standing nano columnar bodies is the cross-sectional area CA of the nano columnar bodies. In FIGS. 16A and 16B, the scale at the bottom right corner is marked with in 30 nm increments.

Next, the method of calculating the surface area ratio of each roughened region in the sealing-property verification experiment will be described below. In this calculation method, plate-shaped metal members are prepared first as the test pieces. These test pieces, formed of the metal members, are referred to as "surface area ratio test pieces". Then, the pulse laser irradiation is performed on one plane of each surface area ratio test piece under various conditions. In this experiment, the one plane of each test piece is the target for the pulse laser irradiation. Further, the specific surface area of each of the surface area ratio test pieces subjected to the pulse laser irradiation is measured by a general krypton gas adsorption method.

Based on the measured specific surface area of the surface area ratio test pieces, the surface area of the pulse-laser irradiated plane of each of the test pieces, referred to as a roughened surface area, is calculated. This roughened surface area is calculated by the following expression 2.

$$\text{Roughened surface area } (\text{m}^2) = \text{Specific surface area } (\text{m}^2/\text{g}) \times \text{Total weight of surface area ratio test piece (g)} - \text{Surface area of Non-roughened portion } (\text{m}^2) \qquad \text{Expression 2}$$

Furthermore, based on the thus calculated roughened surface area of each surface area ratio test piece, the surface area ratio of the pulse-laser irradiated plane of each test piece is calculated. The surface area ratio is calculated by the following expression 3.

$$\text{Surface area ratio} = \text{Roughened surface area } (\text{m}^2) \div \text{Geometric surface area } (\text{m}^2) \qquad \text{Expression 3}$$

As described above, according to the lid member 30 including the joining regions E1 and E2, sealing between the first space (SP1) located outside the battery 1 and the second space (SP2) located inside the battery 1 in combination of the positive-electrode resin member 70 joined to the member surface, the joining regions E1 and E2 respectively include the roughened regions F1 and F2, formed on the member surface of the lid member 30, and each formed with the base layer 35 where debris particles are accumulated and the column group layer 36 composed of the nano columnar bodies 361 formed of the debris particles bonding to one another like strings of beads on the base layer 35 and extending in the height direction to densely stand with the average height of 84 nm or more. Accordingly, this configuration can enhance the sealing properties of the joined surface to the positive-electrode resin member 70, as compared to, for example, the metal member formed with protrusions that cannot be regarded as columnar portions. Similarly, according to the positive terminal member 50 including the joining regions E3 and E4, the joining regions E3 and E4 respectively include the roughened regions F3 and F4, formed on the member surface of the positive terminal member 50, and each formed with the base layer 55 where debris particles are accumulated and the column group layer 56 composed of the nano columnar bodies 561 formed of the debris particles bonding to one another like strings of beads on the base layer 55 and extending in the height direction to densely stand with the average height of 84 nm or more. Accordingly, this configuration can enhance the sealing properties of the joined surface to the positive-electrode resin member 70, as compared to, for example, the metal member formed with protrusions that cannot be regarded as columnar portions.

Moreover, the joining regions E1 and E2 are formed in a ring form surrounding the edge of the positive-electrode insertion hole 33*h* over its entire circumference. The roughened regions F1 and F2 are formed in a ring form corresponding to the shape of the corresponding the joining regions E1 and E2. This configuration increases the sealing properties of the joining regions E1 and E2 to the positive-electrode insertion hole 33*h* when joined to the positive-electrode resin member 70.

Further, the gaps between the nano columnar bodies 361 by reaching the base layer 35 is filled up with the resin forming the positive-electrode resin member 70 joined to the joining regions E1 and E2, resulting in the enhanced sealing properties of the joined portion where the lid member 30 and the positive-electrode resin member 70 are joined together. Similarly, the gaps between the nano columnar bodies 561 by reaching the base layer 55 is filled up with the resin forming the positive-electrode resin member 70 joined to the joining regions E3 and E4, resulting in the enhanced sealing properties of the joined portion where the lid member 30 and the positive-electrode resin member 70 are joined together.

The method for producing the lid member 30 as the metal member includes the laser irradiation step S2 in which debris particles originating from aluminum that forms the lid member 30, generated by the pulse laser irradiation, are accumulated on the surface of the lid member 30, on which the base layer 35 and the column group layer 36 are not formed yet and the roughened regions F1 and F2 are to be formed, and those debris particles grow into the nano columnar bodies 361, constituting the roughened regions F1 and F2. Thus, the lid member 30 can be achieved with the high sealing properties with numerous nano columnar bodies 361 with a height of 84 nm or more. Similarly, the method for producing the positive terminal member 50 includes the laser irradiation step S2 in which debris particles originating from aluminum that forms the positive terminal member 50, irradiated with the pulse laser, are accumulated on the surface of the positive terminal member 50, on which the base layer 55 and the column group layer 56 are not formed yet and the roughened regions F3 and F4 are to be formed, and those debris particles grow into the nano columnar bodies 561, constituting the roughened regions F3 and F4. Thus, the positive terminal member 50 can be achieved with the high sealing properties with numerous nano columnar bodies 561 with a height of 84 nm or more.

Furthermore, the method of producing the battery 1 as the metal-resin composite includes the filling step S31 in which the molten resin MR, melted by heat, to form the positive-electrode resin member 70 is injected to fill the gaps between numerous nano columnar bodies 361 which form the column group layer 36 until reaching the base layer 35 and also to fill the gaps between numerous nano columnar bodies 561 which form the column group layer 56 until reaching the base layer 55, and the solidifying step S32 in which the molten resin MR filled in the gaps between the numerous nano columnar bodies 361 forming the column group layer 36 and the molten resin MR filed in the gaps between the numerous nano columnar bodies 561 forming the column group layer 56 are solidified, thus forming the positive-electrode resin member 70 joined to the roughened regions F1 to F4. This method can produce the battery 1 with high sealing properties, in which the positive-electrode resin member 70 is joined to the surfaces of the base layers 35 and 55 and the surfaces of the nano columnar bodies 361 and 561.

As described above, the joining regions of the lid member 30 joined to the negative-electrode resin member 80 are also roughened as with the roughened regions F1 and F2 so that numerous nano columnar bodies with an average height of 84 nm or more stand densely. Thus, the joining regions of the lid member 30 joined to the negative-electrode resin member 80 can also have enhanced sealing properties. Furthermore, the joining regions of the negative terminal member 60 joined to the negative-electrode resin member 80 are also roughened as with the roughened regions F3 and F4 so that numerous nano columnar bodies with an average height of 84 nm or more stand densely. Thus, the joining regions of the negative terminal member 60 joined to the negative-electrode resin member 80 can also have enhanced sealing properties.

The foregoing embodiments are mere examples and give no limitation to the disclosure. Accordingly, the disclosure may be embodied in other specific forms without departing from the essential characteristics thereof. Several examples of modifications and variations of this embodiment will be described below.

The aforementioned embodiment exemplifies the flat wound electrode body as an electrode body housed in the case 10, but alternatively may adopt a laminated electrode body. In the foregoing embodiment, a single electrode body is housed in the case 10, but a plurality of electrode bodies may be accommodated together in the case 10.

In the above-described embodiment, the case 10 has an overall flat and bottomed rectangular parallelepiped shape, but the shape of this case 10 may be changed appropriately to another shape such as a columnar shape. Moreover, one or both of the positive terminal member 50 and the negative terminal member 60 may be changed appropriately to any other shapes. Similarly, one or both of the positive-electrode resin member 70 and the negative-electrode resin member 80 may be changed appropriately to any other shapes. The positive terminal member 50 and the negative terminal member 60 in the above-described embodiment have the same shape, but may have different shapes. Similarly, the positive-electrode resin member 70 and the negative-electrode resin member 80 in the above-described embodiment have the same shape, but may have different shapes.

In the above-described embodiment, the battery 1, in which the lid member and the positive terminal member 50, each made of metal, are respectively joined to the positive-electrode resin member 70, and the lid member 30 and the negative terminal member 60, each made of metal, are respectively joined to the negative-electrode resin member 80 is included in the metal-resin composite of the disclosure. However, the unit member 1A constituting the battery 1 is also included in the metal-resin composite of the disclosure.

In the foregoing embodiment, the disclosure is applied to the lithium-ion secondary battery. However, the disclosure is applicable to any general power storage devices, for example, nickel-metal hydride batteries and nickel-cadmium batteries. The application of the disclosure is not limited to batteries, but is widely applicable to any composites in which a metal member and a resin member are joined to each other.

In the forgoing embodiment, the positive-electrode resin member 70 has reached the base layers 35 in the roughened regions F1 and F2 and the base layers 55 in the roughened regions F3 and F4. As an alternative, the molten resin MR forming the positive-electrode resin member 70 may be filled in the gaps between the numerous nano columnar bodies 361 and the gaps between the numerous nano columnar bodies 561 so as to wholly reach the distal ends of the nano columnar bodies 361 and 561, the portions between the distal ends and the middle portions, nearly the middle portions, or the portions between the middle portions and the proximal ends.

In the foregoing embodiment, the roughened regions F1 and F2 are formed respectively all over the joining regions E1 and E2. As an alternative, the roughened regions F1 and F2 may be formed respectively on parts of the joining regions E1 and E2. In this case, however, the roughened regions F1 and F2 are each preferably formed in a ring shape surrounding the positive-electrode insertion hole 33*h* in the corresponding joining regions E1 and E2. Moreover, the roughened regions F3 and F4 are formed respectively all over the joining regions E3 and E4. As an alternative, the roughened regions F3 and F4 may be formed respectively on parts of the joining regions E3 and E4. In this case, however, the roughened region F3 is preferably formed on all over a part of the joining region E3, corresponding to the positive terminal middle part 53. Further, the roughened region F4 is preferably formed in a ring shape along the joining region E4.

REFERENCE SIGNS LIST

1 Battery
10 Case
20 Case body
30 Lid member
33*h* Positive-electrode insertion hole
34*h* Negative-electrode insertion hole
50 Positive terminal member
60 Negative terminal member
70 Positive-electrode resin member
80 Negative-electrode resin member
35, 55 Base layer
36, 56 Column group layer
361, 561 Nano columnar body
E1 Lid upper-surface joining region
E2 Lid lower-surface joining region
E3 Terminal side-surface joining region
E4 Terminal lower-surface joining region
F1 Lid upper-surface roughened region
F2 Lid lower-surface roughened region
F3 Terminal side-surface roughened region
F4 Terminal lower-surface roughened region

What is claimed is:

1. A metal-resin composite, comprising:

a resin member; and a metal member having a surface with a joining region joined to the resin member to seal between a first space and a second space in combination with the resin member, wherein the joining region includes a roughened region formed on the surface, the roughened region comprising:

a base layer composed of accumulated debris particles; and a column group layer composed of nano columnar bodies standing adjacent to and spaced from one another in two dimensions, the nano columnar bodies being formed of the debris particles bonding to one another in a form of strings of beads extending from the base layer in a height direction, the nano columnar bodies in the roughened region have an average height of 84 nm or more, the metal member is made of copper or aluminum, and the resin member is made of resin filled in gaps between the nano columnar bodies until reaching the base layer.

2. The metal-resin composite according to claim 1, wherein, the first space is located outside the joining region and the second space is located inside the joining region, the joining region has a ring shape, and the roughened region has a ring shape corresponding to the shape of the joining region.

3. A method for producing metal-resin composite according to claim 1, comprising:

irradiating the surface of the metal member, on which the column group layer is not formed and the roughened region is to be formed, with a pulse laser, so that debris particles generated from the metal member irradiated with the pulse laser are accumulated onto the surface of the metal member and grow into the nano columnar bodies to form the roughened region;

filling molten resin melted by heat into gaps between the nano columnar bodies that constitute the column group layer until reaching the base layer; and solidifying the molten resin filled in the gaps between the nano columnar bodies constituting the column group layer to form the resin member joined to the roughened region of the metal member.

4. A method for producing the metal-resin composite according to claim 2, comprising:

irradiating the surface of the metal member, on which the column group layer is not formed and the roughened region is to be formed, with a pulse laser, so that debris particles generated from the metal member irradiated with the pulse laser are accumulated onto the surface of the metal member and grow into the nano columnar bodies to form the roughened region;

filling molten resin melted by heat into gaps between the nano columnar bodies that constitute the column group layer until reaching the base layer; and solidifying the molten resin filled in the gaps between the nano columnar bodies constituting the column group layer to form the resin member joined to the roughened region of the metal member.

* * * * *